United States Patent
Newell et al.

(10) Patent No.: US 10,375,445 B2
(45) Date of Patent: *Aug. 6, 2019

(54) APPARATUS, SYSTEMS AND METHODS FOR PROVISION OF CONTEXTUAL CONTENT

(71) Applicant: EchoStar Technologies L.L.C., Englewood, CO (US)

(72) Inventors: Nicholas Newell, Centennial, CO (US); Swapnil Tilaye, Louisville, CO (US)

(73) Assignee: DISH TECHNOLOGIES L.L.C., Englewood, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 16/004,580

(22) Filed: Jun. 11, 2018

(65) Prior Publication Data

US 2018/0295422 A1 Oct. 11, 2018

Related U.S. Application Data

(63) Continuation of application No. 15/445,091, filed on Feb. 28, 2017, now Pat. No. 9,998,794.

(51) Int. Cl.
*H04N 21/4722* (2011.01)
*H04N 21/81* (2011.01)
*H04N 21/442* (2011.01)
*H04N 21/422* (2011.01)
*H04N 21/4223* (2011.01)
*H04N 21/431* (2011.01)

(52) U.S. Cl.
CPC ... *H04N 21/4722* (2013.01); *H04N 21/44218* (2013.01); *H04N 21/8133* (2013.01); *H04N 21/4223* (2013.01); *H04N 21/42201* (2013.01); *H04N 21/4316* (2013.01)

(58) Field of Classification Search
CPC ........ H04N 21/4722; H04N 21/44218; H04N 21/8133; H04N 21/42201; H04N 21/4223; H04N 21/4316
See application file for complete search history.

(56) References Cited

U.S. PATENT DOCUMENTS

| | | | |
|---|---|---|---|
| 9,741,258 B1* | 8/2017 | Chetlur | G09B 5/12 |
| 9,998,794 B1* | 6/2018 | Newell | H04N 21/4722 |
| 2014/0331264 A1* | 11/2014 | Schneiderman | H04N 21/278 |
| | | | 725/92 |

* cited by examiner

*Primary Examiner* — Hunter B Lonsberry
(74) *Attorney, Agent, or Firm* — Lowe Graham Jones PLLC; Raymond Armentrout

(57) ABSTRACT

An exemplary embodiment provides clarifying supplemental information to a user who has become confused about a currently presenting media content event.

20 Claims, 4 Drawing Sheets

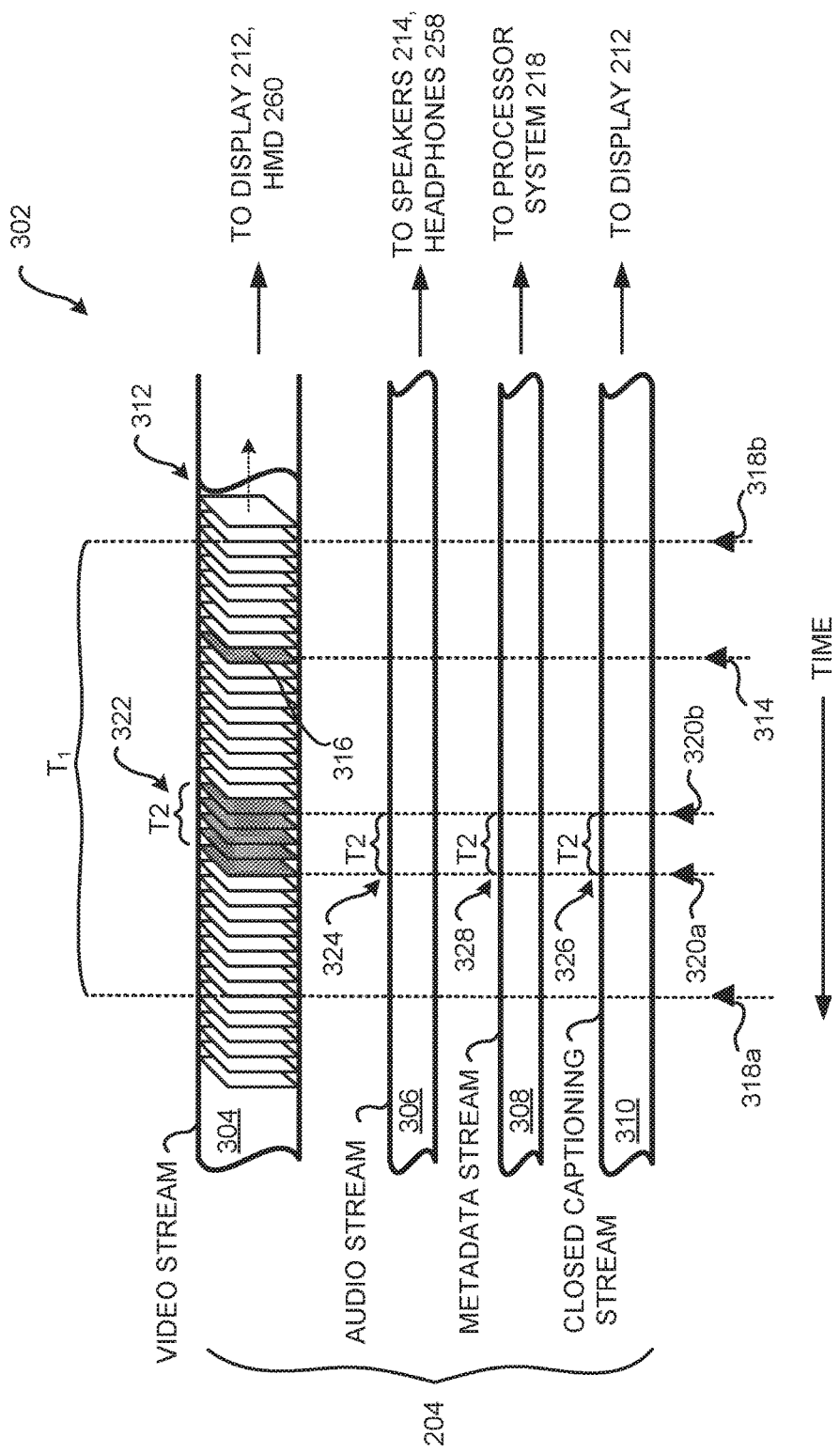

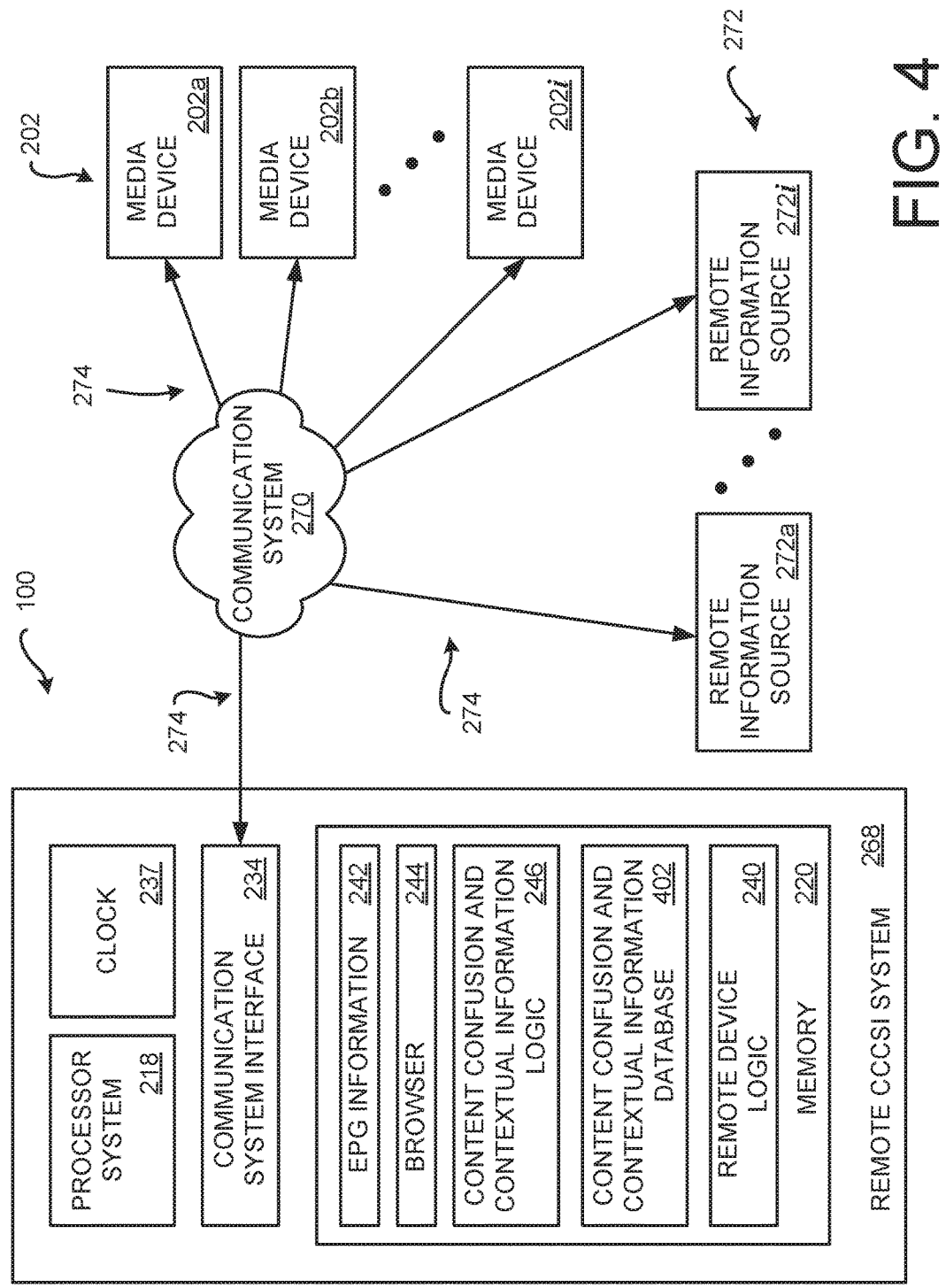

US 10,375,445 B2

APPARATUS, SYSTEMS AND METHODS FOR PROVISION OF CONTEXTUAL CONTENT

PRIORITY CLAIM

This patent application is a Continuation of U.S. application Ser. No. 15/445,091, filed Feb. 28, 2017, entitled "APPARATUS, SYSTEMS AND METHODS FOR PROVISION OF CONTEXTUAL CONTENT," and granted as U.S. Pat. No. 9,998,794 on Jun. 12, 2018, the contents of which are herein incorporated by reference in their entirety.

BACKGROUND

While watching a particular portion of a presenting media content event, a viewer (interchangeably referred to herein as a "user") may not completely understand what is being shown in the video portion of the presenting media content event. Alternatively, or additionally, the viewer may not completely understand the spoken audio portion of the media content event. Alternatively, or additionally, the viewer may not completely understand the reference to a particular element of the media content event because the viewer is not familiar with the topic or subject matter of the media content event, may not natively speak the language being spoken in the dialogue of the audio portion of the media content event, or may not be familiar with the background or history of the reference. In such situations, the viewer may become confused because they are not understanding or comprehending the subject matter of the presenting media content event, at least for some brief duration.

The viewer may use a supplemental electronic device that has a screen or display to access various information sources associated with the confusing subject matter. For example, the viewer may operate a browser operated by the supplemental electronic device to access clarifying supplemental information about a topic that is related to the source of confusion. In such situations, using the second screen of the supplemental electronic device to find the clarifying supplemental information, while concurrently watching the media content event, takes a viewer out of the viewing experience and may further distract the viewer, even to a point of ruining the presentation experience for the viewer.

Alternatively, or additionally, the user may pause presentation of the media content event, and then operate their media device (which is processing the media content event for presentation) to obtain supplemental information to clarify and/or provide supplemental information. For example, the user may access a different media content event that was referenced in the currently presenting media content event. Alternatively, or additionally, the media device (or a presentation device communicatively coupled thereto) may be operated to access a remote information source such as the Internet or the like so that the viewer can obtain clarifying supplemental information. Here, pausing presentation of the media content event and using the media device to access the clarifying supplemental information takes a viewer out of the viewing experience and may further distract the viewer, even to a point of ruining the presentation experience for the viewer.

A relatively large amount of data or information, visual and audible, may be presented for every single shot in each portion of the presenting media content event. For some viewers, the relatively large amount of data may cause potential confusion at various times during the presentation of the media content event. Accessing and then presenting any clarifying supplemental information to the user could be very time consuming. To illustrate the problem using a hypothetical example, consider the situation wherein Presidential nominee Hillary Clinton is speaking at the Rosa Parks Transit Center in Detroit and uses the phrase "back of the bus" while speaking about Rosa Parks and her legacy. A viewer who is unfamiliar with the civil rights movement in the United States may be watching Mrs. Clinton's speech, and may not understand what Mrs. Clinton is speaking about with regard to the phrase "back of the bus." For example, the viewer may become confused because they were born before the civil rights movement and/or may have been born outside of the United States. Thus, the viewer may not be aware of the historical context that is associated with the phrase. It would be desirable to access and present clarifying supplemental information about Rosa Parks and the origin of the phrase "back of the bus" to the viewer. Preferably, the clarifying supplemental information may be presented to the viewer in a timely manner without any break in the viewer's viewing experience in viewing the presenting media content event.

Prior art systems have been configured to provide and present various forms of clarifying supplemental information to the user. For example, metadata with the clarifying supplemental information, or with selectably active Internet links to remote sites that can provide the clarifying supplemental information, may be encoded into the stream of media content that is being received at the viewer's media device (wherein the media content event is provided to the media device in the stream of received media content). The information may in the metadata may be detected by the media device, wherein the media device then may operate to access and present the clarifying supplemental information. However, such processes require a priori knowledge of the viewer's confusion on the part of the content producer, and/or requires at least an expectation that confusion will arise for a particular portion of a presenting media content event, so that the content provider can incorporate the believed-to-be relevant clarifying supplemental information into the media content event.

Further, the content provider can, at best, only guess at what the source of confusion is on the part of their viewer. That is, the content provider may assume for example that a portion of the audio content is causing confusion to the viewer, when in fact, the viewer's confusion is arising from some aspect of the presenting video portion (that is unrelated to the subject matter of the dialogue) of the presenting media content event. Here, the viewer will be presented clarifying supplemental information that is unrelated to their actual source of their confusion, which may even further create additional confusion on the part of the viewer.

Accordingly, there is a need in the arts to provide meaningful clarifying supplemental information to a confused user in a timely manner. Further, such clarifying supplemental information needs to be correctly directed to and associated with the actual source of the viewer's confusion (and not to some other aspect of the presenting media content event).

SUMMARY

Systems and methods of providing clarifying supplemental information to a user who has become confused about a currently presenting media content event are disclosed. An exemplary embodiment provides clarifying supplemental information (interchangeably referred to herein as "contextual content") to a user who has become confused about a currently presenting media content event by receiving information pertaining to the user during presentation of the media content event; determining that there is an occurrence or an onset of user confusion based on the received information pertaining to the user; determining a time of the occurrence or the onset of the user's confusion based on the determination of the occurrence or the onset of the user's confusion; associating a presentation time of a portion of the currently presenting media content event that corresponds to the determined time of the occurrence or the onset of the user's confusion; identifying a part of the portion of the currently presenting media content event that has caused the occurrence or the onset of the user's confusion, wherein the part of the portion of the currently presenting media content event corresponds to at least one of visual, audio or cultural information; accessing information from a remote information source that pertains to the identified part of the portion of the currently presenting media content event that has caused the occurrence or the onset of the user's confusion; generating clarifying supplemental information based on the accessed information, wherein the clarifying supplemental information includes a sufficient amount of clarifying information so that the user may clarify or resolve their confusion in response to presentation of the clarifying supplemental information; and presenting the clarifying supplemental information to the user.

BRIEF DESCRIPTION OF THE DRAWINGS

Preferred and alternative embodiments are described in detail below with reference to the following drawings:

FIG. 3 conceptually illustrates a portion of a streaming media content event currently being presented to the user; and FIG. 4 is a block diagram of a content confusion and contextual supplemental information system that is operable to control a remote content confusion and contextual supplemental information (CCCSI) system.

DETAILED DESCRIPTION

The various embodiments of the content confusion and contextual supplemental information system monitors the state of one or more users (interchangeably referred to herein as a "viewer") who are operating a media device to view a media content event. In the instance where a user becomes confused by some aspect of a presenting portion of media content event, such as a scene or a part thereof, embodiments of the content confusion and contextual supplemental information system 100 detect the user's confusion. Embodiments then identify a source of the user's confusion, access clarifying supplemental information that pertains to one or more attributes of the source of confusion, and then presents the clarifying supplemental information (interchangeably referred to herein as "contextual content") to the user so that the user may clarify or resolve their confusion. That is, embodiments automatically determine when a user becomes confused while viewing a media content event, and then provides information (interchangeably referred to herein as the clarifying supplemental information) which informs the user about some aspect of the media content event which has likely caused their confusion. After the user is presented the clarifying supplemental information, which may be in a visual, textual and/or audio format, the user then understands what has happened in the media content event.

Figure 1:
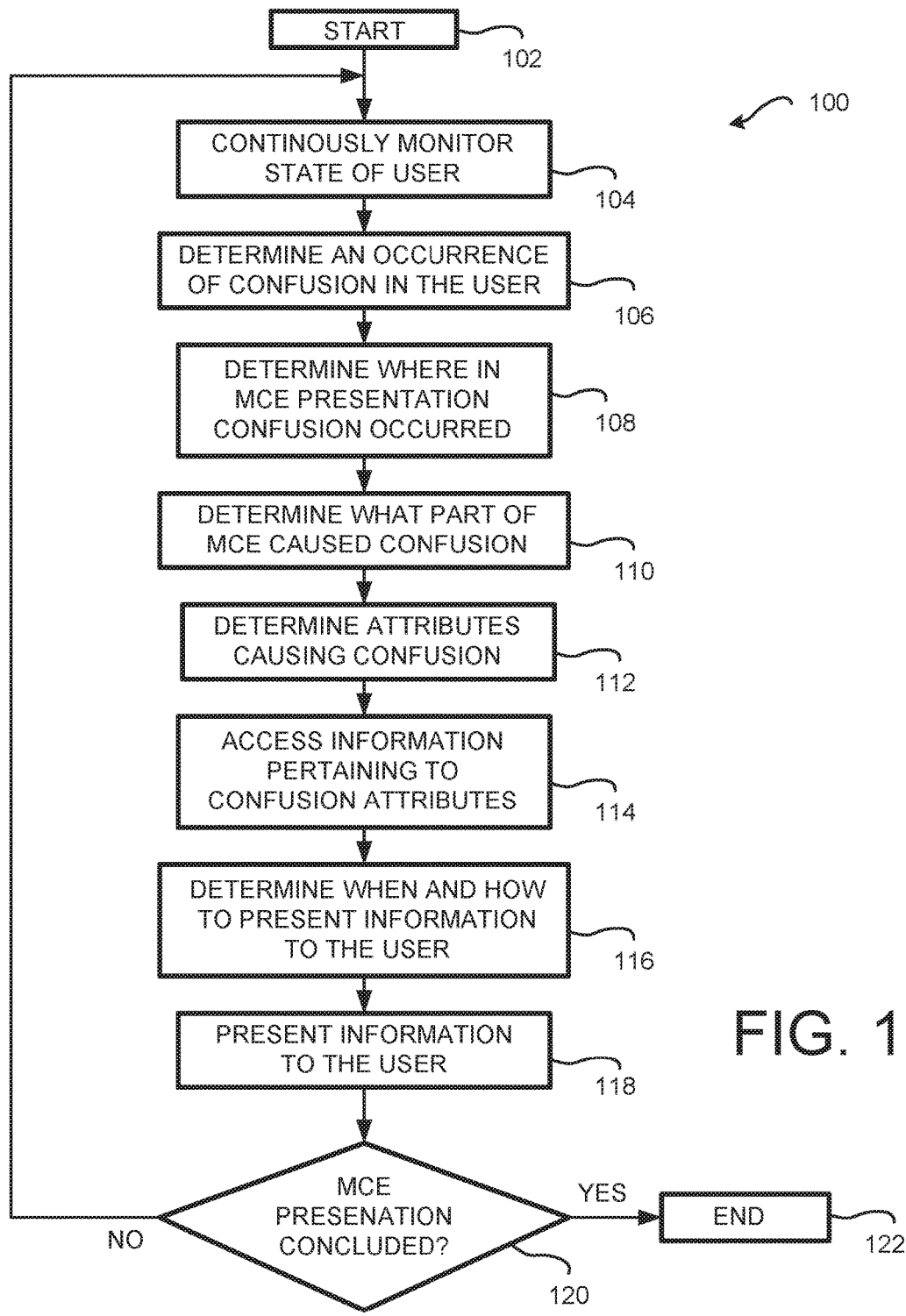
FIG. 1 is a flow diagram conceptually illustrating a process used by a non-limiting example embodiment of content confusion and contextual supplemental information system.

FIG. 1 is a flowchart conceptually illustrating a process used by a non-limiting example embodiment of content confusion and contextual supplemental information system 100. The flowchart of FIG. 1 shows the architecture, functionality, and operation of a possible implementation of the software for implementing one or more embodiments of the content confusion and contextual supplemental information system 100. In this regard, each block illustrated in FIG. 1 may represent a module, segment, or portion of code, which comprises one or more executable instructions for implementing the specified logical function(s). It should also be noted that in some alternative implementations, the functions noted in the blocks may occur out of the order noted in FIG. 1 and/or may include additional functions. For example, two blocks shown in succession in FIG. 1 may in fact be executed substantially concurrently, the blocks may sometimes be executed in the reverse order, or some of the blocks may not be executed in all instances, depending upon the functionality involved, as will be further clarified herein. All such modifications and variations are intended to be included herein within the scope of this disclosure.

Furthermore, one skilled in the art will appreciate that the simplified illustrative flowchart of FIG. 1 describes only one of the many above-described processes of the content confusion and contextual supplemental information system 100. Because of the numerous variations described herein, specific flowcharts are not provided for each of the various alternative embodiments and methods described herein. One skilled in the art will readily appreciate that minor variations and alterations are necessary to the flowchart of FIG. 1 to implement any one, or any combination of, the described alternative embodiments.

The process starts at block 102. Here, the user is viewing a media content event. The process may begin automatically each time the user is viewing the media content event. Alternatively, the process may be initiated in response to a user request, specification or the like. Alternatively, or additionally, the process may be initiated based on some attribute that is received in the streaming media content event, such as a trigger, an instruction generated by the content provider, or the like.

At block 104, embodiments of the content confusion and contextual supplemental information system 100 continuously monitor the state of the user while the user is viewing and/or listening to the presenting media content event. Various attributes of the user, described in greater detail herein, may be monitored to determine the current state of the user.

During the monitoring of the state of the user, the user may become confused by some aspect of the currently presenting media content event. At block 106, embodiments of the content confusion and contextual supplemental information system 100 determine when the user enters into a state of confusion based on the monitoring performed block 104. For example, the user may not understand the meaning of an object shown in a portion of an image being currently shown in the video portion of the media content event. Alternatively, or additionally, the user may not understand the meaning of some portion of the audible dialogue of the media content event, such as when the dialogue includes slang, foreign language, or the like. Alternatively, or additionally, the user may not understand some other aspect of the currently presenting media content event, such as a cultural attribute or the theme, the subject matter, the music, a dance, a ceremony, or the like of the media content event. That is, embodiments of the content confusion and contextual supplemental information system 100 determine an occurrence of confusion in the user.

At block 108, embodiments of the content confusion and contextual supplemental information system 100 determine "where" in the media content event (MCE) presentation the confusion was likely to have occurred. Preferably, the detection of confusion correlates temporally with the determination of what particular portion of the currently presenting media content event (MCE) that the confusion was likely to have occurred.

At block 110, embodiments determine what part of the identified portion of the media content event was likely to have caused the confusion. Here, the term "part" denotes one of the aspects of the currently presenting media content event. A first example "part" includes the video content seen by the user (visual information presented to the user by the currently presenting media content event). Another example part includes the audio content heard by the user (audio information presented to the user by the currently presenting media content event). A third part includes a cultural aspect of the subject matter of the media content event (cultural information presented to the user by the currently presenting media content event). For example, the user may have heard in the presenting dialogue a particular phrase that the user did not understand. The user may simply not have the contextual background or personal knowledge for comprehending the phrase that they heard, such as when the dialogue portion includes slang that the user is not familiar with, or describes some historical and/or cultural aspect that the user is not familiar with. Here, the determined part is the audio content. Or, because of a cultural attribute of the user, such as if the user is from a foreign country or if the dialogue is in a language that is not the user's native language (and thus, the dialogue is not understandable because of this cultural difference), the part of the media content event is determined to be related to culture. Or, the user may not recognize a particular object that is being shown in the video portion of the media content event. Here, the part of the media content event is determined to be visual.

Once the portion of the media content event that is causing the confusion (based on the determination of where in the media content event the confusion occurred) and the part of the media content event (visual, audio and/or cultural) that has likely created the confusion on the part of the user, the process at block 112 determines one or more attributes of the identified part that caused the confusion. For example, if a building shown by the video portion of the media content event is causing the user's confusion, an attribute may be an identifier of the building. As another example, a text phrase of the dialogue may be identified as causing the user's confusion. Or, a particular song or ceremonial dance relating to a different culture, which may be the source of the user's confusion, may be an identified attribute. Any suitable attributes may be identified depending upon the particular nature of the source of the user's confusion.

At block 114, embodiments of the content confusion and contextual supplemental information system 100 access clarifying supplemental information pertaining to the identified attributes of the part of the media content event that has caused the user's confusion. Here, attributes of the available information are compared with the identified part attributes. When a match and/or good correlation is found between the attributes of the information and the identified one or more part attributes, information pertaining to the identified source of the user's confusion may be accessed for presentation to the user (after further processing). Here, the information that is presented to the user is referred to as the clarifying supplemental information.

At block 116, a determination is made as to when and how the clarifying supplemental information it to be presented to the user. Preferably, the clarifying supplemental information can be presented at a time, and be presented using a format, that minimizes the disruption to the user in the presenting media content event while imparting sufficient information to resolve (interchangeably referred to herein as "clarify") the user's confusion.

When the appropriate time arrives to present the clarifying supplemental information to the user (and in the appropriate format), embodiments of the content confusion and contextual supplemental information system 100 present the clarifying supplemental information to the user at block 118. Depending upon the format and the amount of the information included in the clarifying supplemental information, the clarifying supplemental information may be presented to the user in a variety of manners.

In some embodiments, the process may optionally loop back to blocks 104 and 106 to determine if the user's confusion has been resolved (clarified) by the presented clarifying supplemental information. If the user is no longer confused, then the monitoring at block 106 continues. Alternatively, if the user remains confused to some degree, embodiments may present additional clarifying supplemental information in an attempt to further clarify or resolve the user's confusion.

Preferably, after presentation of the clarifying supplemental information, embodiments of the content confusion and contextual supplemental information system 100 determine at block 120 if the media content event is still being presented to the user. If the presentation of the media content event is continuing, the process loops back to block 104 so that the user's state is again continuously monitored for subsequent occurrences of user confusion. However, if the presentation of the media content event has concluded, the process proceeds to block 122 and ends.

It is appreciated that, in parallel to the process of the simplified flow chart illustrated in FIG. 1, embodiments of the content confusion and contextual supplemental information system 100 are monitoring presentation of the media content event to the user. That is, the monitoring at block 104 is ongoing through the presentation of the media content event. If at some point presentation of the media content event ends, such as if the media content event concludes, or if the user changes to a different media content event or if the user turns off their media device, the process proceeds or jumps to block 122 and ends, even if no occurrences of user confusion were determined.

Figure 2:
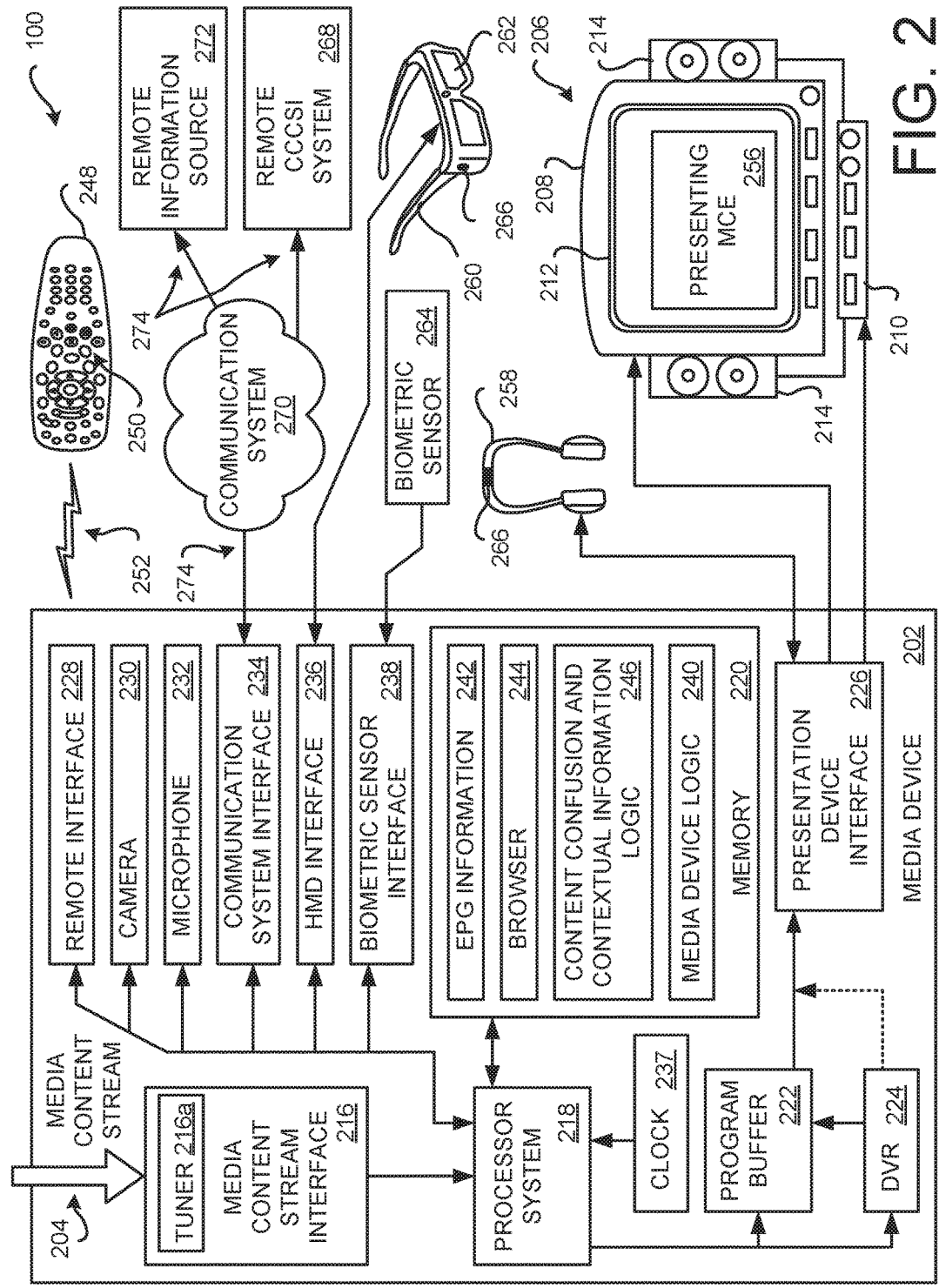
FIG. 2 is a block diagram of a content confusion and contextual supplemental information system that is operable to control a media device, such as, but not limited to, a set top box (STB)

FIG. 2 is a block diagram of a content confusion and contextual supplemental information system 100 that is operable to control a media device 202, such as, but not limited to, a set top box (STB). Embodiments of the content confusion and contextual supplemental information system 100 may be implemented in other media devices, such as, but not limited to, stereos, surround-sound receivers, radios, televisions (TVs), digital video disc (DVD) players, digital video recorders (DVRs), cellular phones equipped with video functionality, personal device assistants (PDAs), game playing devices, or personal computers (PCs) that are configured to present a video-based media content event that is received in a media content stream 204.

The exemplary media device 202 is communicatively coupled to a media presentation system 206 that includes a visual display device 208, such as a television (hereafter, generically a TV), and an audio presentation device 210, such as a surround sound receiver controlling an audio reproduction device. The video portion of the media content event is presented to a user on a display 212 of the visual presentation device 208. The audio portion of the media content is reproduced as audible sounds by one or more speakers 214 of the audio presentation device 210. Other types of output devices may also be coupled to the media device 202, including those providing any sort of stimuli sensible by a human being, such as temperature, vibration and the like. In some embodiments, the media device 202 and one or more of the components of the media presentation system 206 may be integrated into a single electronic device.

The non-limiting exemplary media device 202 comprises a media content stream interface 216, a processor system 218, a memory 220, a program buffer 222, an optional digital video recorder (DVR) 224, a presentation device interface 226, an optional remote interface 228, an optional camera 230, an optional microphone 232, an optional communication system interface 234, an optional head mounted display (HMD) interface 236, an optional clock 237, and an optional biometric sensor interface 238. The memory 220 comprises portions for storing the media device logic 240, the electronic program guide (EPG) information 242, an optional browser 244, and the content confusion and contextual information logic 246. In some embodiments, the media device logic 240 and the content confusion and contextual information logic 246 may be integrated together, and/or may be integrated with other logic. In other embodiments, some or all of these memory and other data manipulation functions may be provided by using a remote server or other electronic devices suitably connected via the Internet or otherwise to a client device. Other media devices 202 may include some, or may omit some, of the above-described media processing components. Further, additional components not described herein may be included in alternative embodiments.

As noted above, a user (not shown) may operate the media device 202 to present a media content event. That is, based upon the user's commands, the media device 202 can then control itself and the various media devices that it is communicatively coupled to, such as the components of the media presentation system 206, in accordance with the generated user commands. As described herein a media content event is preferably thematic content that presents theme-based visual and audio content to a user for their enjoyment and/or for informative purposes. Examples of such theme-based content includes movies, films, serial programming, sporting events, documentaries, newscasts, religious programs, commercials (typically of short duration with advertising content), or the like. Serial programming may present a continuing plot and/or theme, often with the same cast of actors, in a sequential episode-by-episode basis that is available periodically. Commercials may also be considered herein as a short duration media content event.

The functionality of the media device 202, here a set top box, is now broadly described. In a satellite broadcast system, a media content provider provides media content that is received in one or more multiple media content streams 204 multiplexed together in one or more transport channels. The transport channels with the media content streams 204 are communicated to the media device 202 from a media system sourced from a remote head end facility (not shown) operated by the media content provider. The media device 202 is configured to receive one or more broadcasted satellite signals detected by an antenna (not shown). Non-limiting examples of other media systems that broadcast a media content stream 204 include a cable system, a radio frequency (RF) communication system, and the Internet.

Alternatively, or additionally, the media device 202 may receive a media content stream 204 from a memory medium (not shown) that is accessible by the media device 202. Examples of such memory mediums include a flash memory, a digital video disk, or the like. Such memory mediums may be accessible through an electronic device (not shown) that is communicatively coupleable to the media device 202 using a suitable wire-based connector, a wireless system, and/or a connection port or the like.

The one or more media content streams 204 are received by the media content stream interface 216. One or more tuners 216a in the media content stream interface 216 selectively tune to one of the media content streams 204 in accordance with instructions received from the processor system 218. The processor system 218, executing the media device logic 240 and based upon a request for a media content event of interest specified by a user, parses out media content associated with the media content event of interest. The media content event of interest is then assembled into a stream of video and/or audio information which may be stored by the program buffer 222 such that the media content can be streamed out to components of the media presentation system 206, such as the visual display device 208 and/or the audio presentation device 210, via the presentation device interface 226. Alternatively, or additionally, the parsed out media content may be saved into the DVR 224 for later presentation. The DVR 224 may be directly provided in, locally connected to, or remotely connected to, the media device 202. In alternative embodiments, the media content streams 204 may stored for later decompression, processing and/or decryption.

From time to time, information populating the EPG information 242 portion of the memory 220 is communicated to the media device 202, via the media content stream 204 or via another suitable media. The EPG information 242 portion of the memory 220 stores information pertaining to the scheduled programming. The information may include, but is not limited to, a scheduled presentation start and/or end time, a program channel, and descriptive information. The program's descriptive information may include the title of the program, names of performers or actors, date of creation, and a summary describing the nature of the program. Any suitable information may be included in the program's supplemental information. Upon receipt of a command from the user requesting presentation of an EPG display, the information is retrieved, formatted, and then presented on the display 212 as an EPG (not shown).

The exemplary media device 202 is configured to receive commands from a user via a remote control 248. The remote control 248 includes one or more controllers 250 disposed on the surface of the remote control 248. The user, by actuating one or more of the controllers 250, causes the remote control 248 to generate and transmit commands, via a wireless signal 252, to the media device 202. Preferably, each individual one of the controllers 250 has a specific predefined function that causes a specific operation by the media device 202 and/or by components of the media presentation system 206. The commands communicated from the remote control 248 then control the media device 202 and/or control components of the media presentation system 206. The wireless signal 252 may be an infrared (IR) signal or a radio frequency (RF) signal that is detectable by the remote interface 228.

As noted above, a user (not shown) may operate the media device and/or components of the media presentation system 206 to view and listen to a media content event when presented on the exemplary television 208 and/or the exemplary surround sound receiver 210. That is, based upon the user commands, typically generated at and transmitted from the remote control 248 as the wireless signal 252 that is received by the remote interface 228, the media device 202 can then control itself and/or other various media devices that it is communicatively coupled to. Accordingly, a media content event 256 is presented in accordance with the generated user commands.

The processes performed by the media device 202 relating to the processing of the received media content stream 204 and communication of a presentable media content event to the components of the media presentation system 206 are generally implemented by the processor system 218 while executing the media device logic 240. Thus, the media device 202 may perform a variety of functions related to the processing and presentation of one or more media content events received in the media content stream 204.

Embodiments of the content confusion and contextual supplemental information system 100 continuously monitor the state of one or more users who are viewing a presenting media content event. For simplicity, embodiments of the content confusion and contextual supplemental information system 100 are described as monitoring the state of a single user, determining an occurrence or an onset of confusion on the part of the user, and then presenting clarifying supplemental information in response to determining that the user has become confused. Some embodiments may be configured to concurrently monitor a plurality of users who are viewing the presenting media content event 256, and then present clarifying supplemental information to at least the determined confused user in response to determining that the user has become confused. Depending upon the embodiment, the clarifying supplemental information may be presented only to the individual user who has become confused, or the clarifying supplemental information may be optionally presented to all viewing users or to selected viewing users.

For example, if the confused user is listening to the audio portion of the presenting media content event 256 using a set of headphones 258, the clarifying supplemental information may be presented to the confused user as audio information/content. Here, other users are not necessarily presented the clarifying supplemental information (though they may also optionally receive the clarifying supplemental information heard by the confused user).

In some embodiments, the speakers 214 of the media presentation system 206 are directional so as to focus sounds directly to each one of a plurality of users. Here, users can adjust their own sound in accordance with their personal preferences. In such embodiments, the audio portion of the clarifying supplemental information can be focused towards and presented to a particular user, while other users do not hear the audio portion of the clarifying supplemental information.

As another example, if the confused user is listening to and/or is viewing the presenting media content event 256 using a head mounted device (HMD) 260 with one or more displays 262, and one or more speakers, the clarifying supplemental information may be presented to the confused user as video information/content (and/or audio information/content) and/or as audio content. Here, other users are not presented the clarifying supplemental information (though they may also optionally receive the video and/or audio clarifying supplemental information that is being viewed by and or heard by the confused user through their HMD 260).

Embodiments of the content confusion and contextual supplemental information system 100 continuously monitor the state of one or more users who are viewing a presenting media content event. The monitoring of the user may be performed using one or more systems or devices that obtain biometric user information that is analyzed and then used to implicitly determine the user state (a state of confusion or a state of non-confusion). The monitoring may alternatively, or additionally, be based on an explicit action of the user to indicate their confusion. Alternatively, or additionally, the state of the user may be implicitly estimated or assumed based on one or more characteristics of the user in view of characteristics of the presenting media content event. Thus, embodiments of the content confusion and contextual supplemental information system 100 determine an occurrence or an onset of confusion on the part of the user based on sensed information, a user input, and/or an assumption (that is, embodiments are monitoring some aspect pertaining to the user), and then generating and presenting the clarifying supplemental information that is intended to include (provide) a sufficient amount of clarifying supplemental information to the user so that they may clarify or resolve their confusion.

Based on the monitored biometric conditions that are used to determine an occurrence or onset of user confusion, and/or a time that a user input is received, embodiments of the content confusion and contextual supplemental information system 100 determine, estimate, or compute the time of an occurrence or onset of user confusion or time that the user input is received. The cock 237 or another remote time source (not shown) provides information corresponding to real time that is used to determine the time of the occurrence or the onset of confusion on the part of the user. Since the presentation time that a particular video portion or even a single video frame is known or is determinable, the determined real time of the occurrence or the onset of user confusion can be associated with a time of presentation of the video portion and/or audio portion of the presenting media content event.

In an example embodiment that implicitly monitors the user's state by observing some biometric aspect of the user, the optional camera 230 may be oriented towards the viewing one or more users. Camera 230 may be any suitable image capture device that captures a series of still images and/or video. The camera 230 provides image data to the processors system 218 for analysis. In alternative embodiments, the camera 230 may be an external component that is communicatively coupled to the media device 202 via a suitable interface (not shown). Some embodiments may employ multiple cameras 230. As described herein, image data captured by the camera 230 may be used in a plurality of manners to determine whether the user has become confused.

In an example embodiment, the content confusion and contextual information logic 246 may optionally include a suitable facial recognition logic module that is configured to identify a face of the viewing user based on image data captured by the camera 230. The facial recognition logic then further discriminates or identifies the various facial features of the user. Expressions of the user may then be determined from the facial features of the viewing user.

Some facial expressions people are well known to be associated with a state of confusion. Information corresponding to the well known facial expressions are predefined and are saved. The facial expressions of the user determined from the image data are compared with the stored predefined plurality of facial expressions to determine if the user has become confused. If a currently determined facial expression of the user matches or correlates with one or more known facial expressions associated with user confusion, then the user's confusion can be identified or determined.

Further, the time of the occurrence or onset of user confusion can be determined. Here, image data received from the camera 230 is associated with a time that the images were captured. The time may be provided by the clock 237, a clock (not shown) that is integrated into the camera 230, or a remote clock (not shown) or other remote time source. Also, presentation time information corresponding to the portion of the presenting media content event is associated with the determination of the user's confusion and/or that is associated with the image data that indicates that the user was confused.

Then, the clarifying supplemental information can be generated and presented to the user (who is apparently confused based on their determined facial expressions). It is appreciated by one skilled in the art that any suitable facial recognition system now known or later developed may be used in the various embodiments to determine occurrence of the user's confusion. Here, the content confusion and contextual supplemental information system 100, in a novel manner, uses a determination of user confusion to then generate and present clarifying supplemental information to the user that is intended to include and/or provide a sufficient amount of clarifying supplemental information to the user so that they may clarify or resolve their confusion.

In some embodiments, implicit monitoring of the user's state may employ an optional biometric sensor 264 that may be affixed to and/or may be configured to remotely sense one or more physical (biometric) conditions of the user. Sensed biometric conditions may include, but are not limited to, heart rate (using a heart rate sensor), body temperature (using a contact thermometer or an infrared thermometer), pupil dilation (using image data captured by a camera 230), perspiration output (using a water or moisture sensor), and/or blood pressure (using a blood pressure sensor). The biometric sensor 264 provides information to the media device 202 which is analyzed by the content confusion and contextual information logic 246 under the execution by the processor system 218. The time that the biometric data is received is determined by the clock 237 or another suitable time source.

If an amount of a change in a sensed biometric condition is detected, sensed or determined that exceeds a change threshold, and/or if a value of the sensed biometric condition exceeds some associated predefined value threshold, embodiments of the content confusion and contextual supplemental information system 100 may then determine that the user has become confused about some aspect of the currently presenting media content event 256. Further, the time of the occurrence or onset of user confusion can be determined based on the time that is associated with the received biometric data.

For example, biometric sensor 264 may detect blood pressure and/or a heart rate of the user. Embodiments of the monitor the blood pressure and/or the heart rate of the user, and then determine an amount of the change in blood pressure and/or heart rate. The amount of the detected change of the blood pressure and/or a heart rate is compared with some predefined change value that is associated with a change in blood pressure and/or a heart rate. If the change exceeds the threshold, a state of user confusion may be detected/determined. Alternatively, or additionally, a value of the blood pressure and/or heart rate may be compared with a predefined value or threshold. If the blood pressure and/or a heart rate value exceeds the predefined value, a state of user confusion may be detected/determined. In response thereto, the content confusion and contextual supplemental information system 100 may then determine the time that the user has become confused by some part of the currently presenting media content event 256 since both the presentation time of the portion of the media content event and the time of the biometric data are known. Then, the clarifying supplemental information can then be generated and presented to the user.

As another non-limiting example of implicit user monitoring, pupil dilation of the user's eyes may be monitored based on image information captured by the camera 230 or by another camera (such as a camera that is integrated into the HMD 260). A value of pupil dilation can be measured from the captured image data. If an amount of the pupil dilation changes by some predefined amount and/or exceeds a predefined threshold that is associated with user confusion, the content confusion and contextual supplemental information system 100 may then determine the occurrence or the onset of confusion on the part of the user. The image data is associated with a time that the images were captured. Accordingly, the time that the user has become confused by some part of the currently presenting media content event 256 can be determined, and the clarifying supplemental information can then be generated and presented to the user.

Eye orientation (the direction of viewing of the user's eye) may also be used to determine user confusion. For example, in instances where the media content event is being presented on the HMD 260 worn by the user, a sensor or camera (not shown) integrated into the HMD 260 may monitor the orientation of the user's eye. Rapid and/or repeated changes in the user's eye orientation may implicitly indicate a likelihood of user confusion.

Some embodiments may have a predefined portion on the display 262 of the HMD 260 that is predefined to be associated with the occurrence or onset of confusion. Assuming that the user understands that they may redirect the orientation of their eyes to look at the predefined location on the display 262 to indicate their confusion, embodiments of the content confusion and contextual supplemental information system 100 may make the determination of the time of an occurrence or onset of user confusion when the user looks at the predefined location on the display 262. For example, a small area located in the upper left hand region of the display 262 of the HMD 260 may be predefined to be associated with user confusion. If the user intentionally looks upward to the left, then the eye orientation is detected and then the occurrence or the onset of confusion on the part of the user may be determined. Further, a plurality of different areas of the display 262 may be associated with the part of the media content event (visual, audio, or culture) that is causing the user's confusion. Thus, the particular location that the user is looking at may be used to determine the source of the confusion.

Alternatively, or additionally, body temperature, perspiration or the like of the user's body may be monitored. If the biometric sensors 264 sense information that is used to determine changes in the body temperature, perspiration or the like by some predefined amount and/or exceeds a predefined threshold that is associated with user confusion, the content confusion and contextual supplemental information system 100 may then determine the occurrence or the onset of confusion on the part of the user. Also, since the biometric information is associated with the time that the biometric information was sensed, the time that the user has become confused by some part of the currently presenting media content event 256 may be determined, Then, the clarifying supplemental information can be generated and presented to the user.

Alternatively, or additionally, the biometric sensor 264 may be one or more electrode sensors that are affixed to or are in contact with the user's head, or more particularly, is affixed to or is in contact with the user's scalp. Based on brain activity detected by the electrodes, the content confusion and contextual information logic 246 is configured to perform an electroencephalogram (EEG) test that measures and records the electrical activity of the user's brain. Here, the electrodes measure voltage fluctuations resulting from ionic current within the neurons of the user's brain. In clinical contexts, EEG refers to the recording of the brain's spontaneous electrical activity over a period of time, as recorded from the multiple electrodes placed on or in contact with the scalp. Diagnostic applications generally focus on the spectral content of EEG, that is, the type of neural oscillations (popularly called "brain waves") that can be observed in EEG signals. Various derivatives of an EEG test may also be used by the various embodiments.

Detected brain wave activity may be correlated with known patterns of brain wave activity that are associated with confusion. Thus, when the detected brain wave activity of a user who is viewing the currently presenting media content event 256 correspond with the brain wave activity patterns associated with confusion, the content confusion and contextual supplemental information system 100 may then determine the occurrence or the onset of confusion on the part of the user. Further, the brain wave information is associated with time so that the time that the user has become confused by some part of the currently presenting media content event 256 is determined. It is appreciated by one skilled in the art that any suitable EEG test system now known or later developed may be used in the various embodiments to determine the occurrence of the user's confusion. Here, the content confusion and contextual supplemental information system 100, in a novel manner, uses and determines the occurrence or the onset of confusion on the part of the user and the time of the occurrence or onset of user confusion based on the sensed brain wave activity of the user. Then, the clarifying supplemental information may be generated and presented to the user.

The detected brain waves and the attendant EEG analysis may be used in a variety of manners to define the part of the media content event that is the source of the user's confusion. In an example embodiment, an indicator, icon or the like may be presented to the user on the display 212 (or on the display 262 of the HMD 260) which queries the user about potential confusion. The query may be generated and presented in response an implicit determination that the user might be confused. The user may then simply think a "yes" or "no" response when the query is presented to the user. Since the brain wave activity of a "yes" response and a "no" response are different, the user's answer to the query can be interpreted from the detected brain wave activity. If the user's answer is "yes" to the query, the occurrence or the onset of confusion on the part of the user can be determined. Since the time that the query was presented is known, the time of the occurrence or the onset of confusion on the part of the user can also be determined.

The EEG analysis may detect where the user's eye has been focused to. For example, a portion of the display 212 (or on the display 262 of the HMD 260) may be associated with a location that indicates user confusion. When the user focuses on that location on the display 212 (or on the display 262 of the HMD 260), embodiments may determine that the presenting media content event is causing confusion is the visual part. Since the time that the focusing of the user's eyes is known, the time of the occurrence or the onset of confusion on the part of the user can also be determined.

In some embodiments, the user may simply think about which part (visual, audio, cultural) of the media content event is the source of their confusion. The brain wave activity when the user thinks about the term "visual" may be different and discernible from brain wave activity when the user thinks the term "audio" or "cultural" as being the source of their confusion. Here, the amplitude, phase, and/or frequency of the brain wave activity may be used to identify which part of the media content event is causing the user's confusion. Such brain wave analysis techniques are commonly known as neural oscillation techniques. Embodiments of the content confusion and contextual supplemental information system 100 may employ any known or later developed neural oscillation technique to identify an occurrence or onset of user confusion, determine which part (visual, audio, cultural) of the media content event is the source of their confusion, and/or determine particular attributes associated with the user's confusion. Since the time of the detected brain wave activity is known, the time of the occurrence or the onset of confusion on the part of the user can also be determined Further, the location of brain waive activity may be associated with which part of the media content event is the source of the user's confusion. For example, a specific region of the user's brain is known to become more active when visual information is being processed (which may be associated with the visual part of the media content event). Another part of the brain is known to become more active when audio information is being processed (which may be associated with the audio part of the media content event). Yet another part of the brain is known to become more active when a cognitive function is being performed (which may be associated with the cultural part of the media content event). Here, embodiments monitor levels of brain activity in the various regions of the user's brain, and in the event a particular amount of change in brain activity in a particular region is detected, then the occurrence or the onset of confusion on the part of the user can be determined. Further, the part of the media content event that is causing the user's confusion can be determined. Since the time of the detected brain activity is known, the time of the occurrence or the onset of confusion on the part of the user can also be determined It is appreciated that affixing a plurality of electrode sensors to the user's head or scalp may not be particularly comfortable for the user who is viewing the currently presenting media content event 256 for their enjoyment. Accordingly, one or more non-contact electrode sensors or contact electrode sensors (here, the biometric sensor 264) may be incorporated as a component of a worn device that is being used by the user. For example, but not limited to, the headphone 258 and/or the HMD 260 may include an integrated biometric sensor 266 that is configured to detect the brain wave activity of the user.

In some embodiments, a plurality of biometric sensors 264 may be used to detect a plurality of different biometric conditions of the user. Embodiments of the content confusion and contextual supplemental information system 100 may then analyze the plurality of different detected biometric conditions to implicitly determine when the user has become confused. When multiple biometric conditions indicate that the user has become confused, the implicit determination of the likelihood that the user is actually confused can be increased. That is, when a plurality of different sensed biometric conditions implicitly indicate that the user has become confused, the probability that a correct determination of confusion has been made by the content confusion and contextual supplemental information system 100 increases.

Alternatively, or additionally, the multiple detected biometric conditions may help refine the determination of the time of an occurrence or onset of user confusion. Here, response times between the mental onset of confusion and the physical manifestation of the user's confusion may require some duration. When such durations are known, the time of the onset of the user's confusion may be estimated or computed by adjusting the time associated with receipt of the biometric data. When a plurality of different detected biometric conditions are considered together, the plurality of determined confusion onset times may be compared, averaged together, or the like so as to more accurately estimate the time of the onset of user confusion.

Further, multiple detected biometric conditions may help refine the determination of the particular part of the media content event which is the apparent source of the user's confusion. For example, pupil dilation may more closely correspond to the video portion of the currently presenting media content event 256. Thus, a change in pupil dilation may be associated with the visual part of the media content event. In contrast, a change in blood pressure, heart rate, perspiration and/or body temperature may more closely correlate to the cultural part and/or the audio part of the currently presenting media content event 256. Thus, a detected change in the user's blood pressure, heart rate, perspiration and/or body temperature may indicate that the source of user confusion is the cultural part and/or the audio part of the currently presenting media content event 256.

It is appreciated by one skilled in the art that any suitable biometric condition monitoring system now known or later developed may be used in the various embodiments to implicitly determine the occurrence of the user's confusion. Here, the content confusion and contextual supplemental information system 100, in a novel manner, uses an implicit determination of the occurrence or onset of user confusion based on the sensed biometric condition of the user. Then, embodiments may determine the time of the occurrence or onset of user confusion to determine a state of user confusion, associate the time of user confusion with presentation times of the media content event, identify the part of the media content event that has likely caused the user's confusion, and then generate and present clarifying supplemental information to the user.

Embodiments of the content confusion and contextual supplemental information system 100 may alternatively, or additionally, employ other systems and processes of monitoring the user's state and/or to explicitly determine an occurrence or onset of user confusion (and the associated time). For example, an explicit determination of the user's confusion may be made based on direct user input. In an example embodiment, one or more of the controllers 250 of the remote control 248 and/or another electronic device may have a predefined function such that when actuated by the user, information in the communicated wireless signal 252 indicates confusion on the part of the user. Here, the remote control is an electronic device, wherein the electronic device is operated by the user to generate the user input that is communicated to the media device 202. The time that the user input is received can be used to estimate or determine the time of the occurrence or onset of user confusion.

Further, one skilled in the art appreciates that there is an inherent time delay between the onset or occurrence of confusion and the actuation of a controller 250 by the user. That is, some first amount of time is required for the user to cognitively realize or determine that they have become confused. Further, a second amount of time is required for the user respond to their confusion and to actuate the controller 250. That is, a small amount of time is required to actuate the controller 250 after they have realized that they have become confused. These time delays may be estimated and then used to more accurately determine the actual time of the occurrence or onset of user confusion. Here, the amount of the first and/or the second times may be used to decrement the time that the user input was received. That is, a duration of time may be predefined, wherein the predefined time corresponds to a time that the part of the currently presenting media content event that caused the occurrence or the onset of the user's confusion was initially presented to the user and a subsequent reaction time of the user, wherein the adjusted time is used to determine the time of the occurrence or the onset of the user's confusion.

A single controller 250 on the remote control 248 may be used to indicate generic confusion. Alternatively, a plurality of controllers may be used to indicate some aspect of the part of the currently presenting media content event 256 that is the source of the user's confusion. For example a first controller 250 may indicate that some portion of the video content has caused the user confusion. A second controller 250 may indicate that some portion of the audio content has caused the user confusion. Optionally, a third controller 250 may indicate that some cultural aspect of the currently presenting media content event 256 has caused the user confusion. Similarly, controllers on the other electronic device that is communicatively coupled to the media device 202 may be actuated by the user to indicate confusion. Non-limiting examples of such electronic devices include a smart phone, cellular phone, personal computer, notebook computer, laptop computer, or other electronic device. Further, the remote control 248 or other electronic device may include a touch sensitive display that emulates the physical controllers 250. Thus, user input may be made via a touch sensitive display. Alternatively, or additionally, a graphical user interface displayed on the remote control 248, the display 212, or on another electronic device may be used to generate the user input that indicates the user's confusion. Here, the electronic device is operated by the user to generate the user input that is communicated to the media device 202.

In some embodiments, actuation of a controller 250 may cause generation and presentation of a graphical user interface (GUI) that enables the user to specify attributes or characteristics about their source of confusion. For example, a pop-up window or the like may be presented on a display of the remote control 248, on the display 212, or on another electronic device display which allows the user to specify which part (visual, audio, cultural) of the media content event is the source of their confusion. Alternatively, or additionally, a text entry system may be provided wherein the user is able to specify in detail precisely what is confusing the user. For example, if the phrase "back of the bus" that is associated with the historical civil rights movement has confused the user, the user may specify that phrase by entering the text of that phrase.

In some embodiments, the user may specify information articulating the basis of their confusion using a keyboard, GUI, or another electronic device that communicates the user input to the media device 202. The user input may identify which part (visual, audio, and/or cultural) of the media content event is the source of their confusion. Further, the user may specify with particularity one or more attributes of the part that identifies the source of their confusion. For example, the user may specify or type in that they do not understand the cultural aspect of the currently presenting song heard in the audio portion of the media content event and/or a dance being viewed in the video portion of the currently presenting media content event. Accordingly, embodiments of the content confusion and contextual supplemental information system 100 determine the occurrence or the onset of confusion on the part of the user based on receipt of the user's input. Since a time is associated with the receipt of the user input, the time of the occurrence or the onset of confusion on the part of the user is known. Then, clarifying supplemental information pertaining to the identified song and/or dance may be generated and presented to the user.

In some embodiments, the content confusion and contextual information logic 246 may include speech recognition logic that is configured to identify speech (words and phrases) spoken by the user that is detected by the microphone 232. The content confusion and contextual supplemental information system 100 may be configured to recognize key terms or phrases spoken by the user (also known by the user to indicate their confusion). For example, the spoken word "help" may be used to indicate user confusion. In response to detecting that the user has spoken the word "help" during presentation of the media content event 256, embodiments will then recognize the occurrence of confusion on the part of the user. Any suitable word or phrase may be used to determine or indicate the occurrence or the onset of confusion on the part of the user.

Alternatively, or additionally, spoken phrases may also be identified and then used to identify the occurrence or the onset of confusion on the part of the user. For example, the user may say that "I don't understand the dialogue" or "I don't understand the words" such that a determination of confusion about the audio part may be made. Further, the indication of the dialogue in the detected spoken phrase may be used to determine which part of the currently presenting media content event 256 that is causing the user confusion is the audio portion. Similarly, the spoken phrase "I don't understand what the object is" may be used to determine that the visual part of the currently presenting media content event 256 is causing the user confusion. Further, the user's words may describe a particular object that is shown in the video portion, and thus further enable the content confusion and contextual supplemental information system 100 to identify the particular object that is causing the user's confusion. As yet another illustrative example, the spoken phrase "I don't understand this song" or "I don't understand the words" may be used to determine that the culture part of the currently presenting media content event 256 is causing the user's confusion.

Some embodiments of the content confusion and contextual supplemental information system 100 may be configured with a learning algorithm which learns which particular spoken phrases are intended by the user to correspond to a request for the clarifying supplemental information. Thus, when a user later repeats a particular phrase or a similar phrase, previous determinations pertaining to the nature of the user's confusion have trained the embodiment to use the newly detected spoken phrase to more accurately determine the nature of the current state of the user's confusion.

It is appreciated by one skilled in the art that any suitable speech recognition system and/or learning system now known or later developed may be used in the various embodiments to determine the occurrence or the onset of confusion on the part of the user. Here, the content confusion and contextual supplemental information system 100, in a novel manner, uses a determination of the user's confusion based on the detected speech of the user to determine a state of user confusion, uses a time that the speech was received to determine the time of the occurrence or the onset of confusion on the part of the user, and then to generate and present the clarifying supplemental information to the user.

Further, one skilled in the art appreciates that there is an inherent time delay between the onset or occurrence of confusion and the verbal expression of their confusion by the user. That is, some first amount of time is required to the user to cognitively realize or determine that they have become confused, and a second amount of time is required for the user to verbalize their confusion after they have realized that they have become confused. These time delays may be estimated and then used to more accurately determine the actual time of the occurrence or onset of user confusion as described herein.

Embodiments of the content confusion and contextual supplemental information system 100 may alternatively, or additionally, employ other implicit processes to determine an occurrence or onset of user confusion (and the associated time). One skilled in the art appreciates that the age of a viewer may be a contributing factor of an occurrence or onset of user confusion. For example, a relatively young user may lack a historical perspective or knowledge about a currently presenting portion of the media content event. To illustrate, a young person may not understand the historical context of the phrase "back of the bus" that is associated with the historical civil rights movement. Accordingly, embodiments of the content confusion and contextual supplemental information system 100 may be configured to anticipate that this young user might become confused upon hearing this phrase in the dialogue of the presenting media content event. On the other hand, a relatively older user may lack a cultural perspective of the younger generation, and therefore, may not appreciate the meaning of current slang phrases and/or may not appreciate various aspects of contemporary songs, dances and/or activities that young people are familiar with. To illustrate, a relatively older person may not have encountered the new sport of wind surfing (that employs a surfboard and a sail, kite or the like to propel the user over the water). Accordingly, embodiments may be configured to anticipate that they might become confused when seeing a video of someone windsurfing.

Accordingly, some embodiments of the content confusion and contextual supplemental information system 100 may be optionally configured to determine the age of the viewing user. The age of the user may be associated with age-associated topics, images, or the like that may be expected to be encountered while viewing and/or listening to a media content event, and which may be anticipated to cause user confusion for that particular user. In an example embodiment, a library or other database is maintained that associates user age (or age ranges) with a plurality of different age-associated topics, images, or the like. Once the user's age is determined, the media content event may be analyzed to determine if one or more of the age-associated topics, images, or the like are to be presented. When a match between the user's age and one or more age-associated topics, images, or the like in a currently presenting media content event is identified, then embodiments of the content confusion and contextual supplemental information system 100 may then anticipate that the user is likely to become confused when those portions of the media content event are presented.

Here, the clarifying supplemental information may be optionally predefined and may be readily available for presentation to the user. That is, for each of the age-associated topics, images, or the like, the associated clarifying supplemental information may be predefined and stored so as to be readily available at the media device 202. In some embodiments, the clarifying supplemental information may be automatically presented in conjunction with presentation of that portion of the media content event which is presenting the age-associated topics, images, or the like. Alternatively, the clarifying supplemental information may be presented to the user prior to or after presentation of the media content event. Or, the clarifying supplemental information may be presented prior to presentation of the portion of the media content event that is presenting the age-associated topics, images, or the like.

For example, prior to viewing the media content event, the age of the user may be determined and then used to identify one or more age-associated topics, images, or the like that will be presented in the media content event. Prior to presenting the media content event (or even during the initial part of the media content event, such as during the opening credits), the clarifying supplemental information pertaining to the identified age-associated topics, images, or the like may be presented to the user. Thus, when the age-associated topics, images, or the like are presented in the media content event, the user is not likely to become confused when they view and/or listen to that portion of the media content event. Alternatively, the clarifying supplemental information may be presented at the conclusion of the media content event. Thus, the user will then later appreciate those confusing portions of the presented media content event.

Embodiments of the content confusion and contextual supplemental information system 100 may determine the age of the user in a variety of manners. One or more images of the user captured by the camera 230 may be analyzed to estimate the user's age. For example, hair color may tend to indicate user age (for example, grey hair may be associated with older users and a bright color, such as green, blue, purple or the like may be associated with younger users). Hair density (e.g., baldness) may tend to indicate user age (where the presence of baldness may be associated with an older user and an absence of baldness may be associated with a younger user). As yet another example, hair styles may be identified in the captured images of the user, wherein certain hair styles may be associated with different user ages. The presence of facial lines or wrinkles may be associated with older users. Any suitable facial characteristic may be analyzed by the various embodiments to estimate a user's age.

User age may be readily available from other sources. For example, but not limited to, the user's age may be part of the user's account information with the media content provider. Alternatively, or additionally, the user may have previously specified their age in information that is accessible by the media device 202. Information relating to age may also be used to estimate user age. For example, a social security number may indicate user age. The number of years that the user has been a subscriber to the media content provider may be used to estimate user age. Social media platforms may be accessed to obtain information that can be used to estimate the user's age. For example the social media platform may have the date of the user's high school graduation as part of the user's profile information, from which the age of the user can be estimated there from. The browser 244 may be operated to access these various information sources so that the content confusion and contextual supplemental information system 100 may determine the user's age.

Previous viewing habits of the user may be used to estimate the user's age. For example, younger aged viewers may prefer to watch reality television shows of a certain type. In contrast, an older user may tend to watch re-runs of previously released syndicated television program series. Thus, a historical analysis of user viewing patterns may be used to determine an estimated user age.

Some embodiments of the content confusion and contextual supplemental information system 100 may be optionally configured to determine the culture of the viewing user. The culture of the user may be associated with culture-associated topics, images, or the like that may be expected to be encountered while viewing and/or listening to a media content event. In an example embodiment, a library or other database is maintained that associates user culture with a plurality of different culture-associated topics, images, or the like. Once the user's culture is determined, the media content event may be analyzed to determine if one or more of the culture-associated topics, images, or the like which the user is not likely to be familiar with will be presented. When a match between the user's culture and one or more culture-associated topics, images, or the like in a currently presenting media content event is identified, then embodiments of the content confusion and contextual supplemental information system 100 may then anticipate that the user is likely to become confused when those portions of the media content event are presented.

For example, the user's culture and/or native language may be determined to be related to an Indian national. Thus, if the media content event is presenting a culture-associated topic, image, or the like associated with a European culture, embodiments of the content confusion and contextual supplemental information system 100 may be configured to anticipate that the user will likely become confused when that portion of the media content event with the culture-associated topic, image, or the like is presented. In response to determining the likelihood of culture-associated confusion, embodiments may generate and present culture-associated clarifying supplemental information to the user so that they may clarify or resolve any confusion that may arise.

As another example, the user may have difficulty in understanding the dialect and/or accent used by the actors who are speaking the dialogue of the presenting media content event (here, considered as a culture part of the media content event). If a determination is made that the user will have difficulty in understand the dialogue because of a cultural difference, then the culture-associated clarifying supplemental information may be presented to the user. For example, text corresponding to the spoken dialogue may be presented to the user on the display 212 or on the display of another electronic device, such as their smart phone, cellular phone, personal computer, notebook computer, laptop computer, or the like. Or, if the user is wearing the headphones 258 or the HMD 260, an audio translation of the presenting dialogue may be presented to the user.

As yet another example, the determined culture of the user may be associated with a native language of the user. The culture-associated topics, images, or the like may be various phrases that the user may simply not understand. Or, the user may not appreciate the context of the dialogue. To illustrate, a user whose native language is Indian may simply not understand the meaning or context of the phrase "ride 'em cowboy" when spoken by an actor of the media content event. Accordingly, embodiments of the content confusion and contextual supplemental information system 100 may generate and present clarifying supplemental information that explains the context of this phrase. Alternatively, or additionally, the term "cowboy" may be clarified with text that states to the effect that a cowboy is a person who rides a horse to herd cattle while working on a cattle ranch.

Presentation of the clarifying supplemental information may be presented to the user at various times. For example, prior to viewing the media content event, the culture of the user may be determined and then used to identify one or more culture-associated topics, images, or the like that will be presented in the media content event. Prior to presenting the media content event (or even during the initial part of the media content event, such as during the opening credits), the clarifying culture-associated supplemental information pertaining to the identified culture-associated topics, images, or the like may be presented to the user. Thus, when the culture-associated topics, images, or the like are presented in the media content event, the user is not likely to no become confused when they view or listen to that portion of the media content event. Alternatively, the clarifying supplemental information may be presented at the conclusion of the media content event. Thus, the user will then later appreciate those confusion portions of the presented media content event.

Embodiments of the content confusion and contextual supplemental information system 100 may determine the culture of the user in a variety of manners. One or more images of the user captured by the camera 230 may be analyzed to estimate the user's culture. For example, hair and/or skin color may tend to indicate the user's culture. For example, red hair and light skin may be associated with European users. In contrast, a black hair color and a darker skin tone may be associated with an Asian user. As yet another example, hair styles may be identified in the captured images of the user, wherein certain hair styles may be associated with different user cultures. Any cultural profiling process and/or system now known or later developed may be used by the various embodiment of the content confusion and contextual supplemental information system 100.

Information about the user's culture may be readily available from other sources. For example, the user may have specified their culture in information that is accessible by the media device 202. Information relating to culture may also be used to estimate user culture. For example, a passport number, work visa, or the like may indicate where the user has lived such that their culture may be inferred. Social media platforms may be accessed using the browser 244 to obtain information that can be used to estimate the user's culture. For example the social media platform may indicate the birth country or prior residence locations of the user as part of the user's profile information, from which the culture of the user can be estimated there from.

Previous viewing habits of the user may be used to estimate the user's culture. For example, a user may prefer to watch television shows that have a particular native language dialogue. The language of the dialogue may be associated with a particular culture. Here, the language of the dialogue of the media content event, which is associated with one or more particular cultures, may be associated with the culture of the user. Thus, a historical analysis of user viewing patterns may be used to determine or estimate the user's culture.

Some embodiments of the content confusion and contextual supplemental information system 100 may be configured to learn about potential topics, images, or the like that may be anticipated to cause confusion on the part of the user. Past user viewing history may be compared with previous instances of user confusion. The past instances of user confusion may be associated with types or categories of topics, images, or the like that may be presented in a media content event. A presenting media content event may be analyzed to determine whether potential topics, images, or the like which will be presented may cause user confusion (especially for the particular viewing user based on their age attributes and/or cultural attributes). If one or more potential topics, images, or the like which are likely to cause user confusion are identified in a currently presenting media content event, then clarifying supplemental information may be generated and presented to the user at a suitable time (before, during and/or after presentation of the media content event).

To conceptually illustrate this learning process, consider a hypothetical user who was born in another country. During previous presentation of one or more media content events dealing with U.S. history of the civil war, the user had became confused because they were not familiar with this particular historical topic. When some aspect of civil rights is presented in the currently presented media content event, such as when the phrase "back of the bus" is spoken in the dialogue of the media content event, and since the content confusion and contextual supplemental information system 100 has learned that the user is not familiar with the civil war and thus, is not likely familiar with the later civil rights movement in the U.S., clarifying supplemental information may be generated and presented to the user so that the likelihood of user confusion when the phrase "back of the bus" is spoken in the dialogue of the media content event. Such clarifying supplemental information may be generated and presented at any suitable time (before, during and/or after presentation of the media content event).

Learning may be based on any implicit or explicit source that identifies user confusion. Embodiments develop a database that lists the topics, images, or the like that have previously created user confusion. Topics, images, or the like (interchangeably referred to herein as attributes of the media content event) of a presenting media content event are compared with the database attributes associated with topics, images, or the like that previously caused user confusion. If a topic, image, or the like of the presenting media content event matches with or correlates to one or more of the database topics, images, or the like, that particular topic, image, or the like may be implicitly determined to be a potential topic, image, or the like that may cause user confusion. Accordingly, suitable clarifying supplemental information may be generated and presented to the user to reduce the likelihood of confusion when that particular topic, image, or the like in presented in the media content event.

As noted herein, prior art methods of including supplemental information (that may correspond to clarifying supplemental information) may be included in a media content event. Here, the content producers or another part may add such supplemental information into the media content event, such as into the metadata or the like. Or, triggers or the like with embedded html or other communication link information may be included which enable the media device 202 to access remote source to obtain the supplemental information. Embodiments of the content confusion and contextual supplemental information system 100 may be optionally configured to monitor for the occurrence of such supplemental information in the streaming media content event.

When such supplemental information is encountered, embodiments analyze the subject matter and/or content of the received supplemental information to determine attributes that are then associated with the supplemental information. The determined attributes associated with the supplemental information may then be compared with known attributes of the user (the user's age, the user's culture, etc.). If one or more attributes associated with the supplemental information matches with or correlates to one or more of the user attributes, embodiments of the content confusion and contextual supplemental information system 100 implicitly determine that there will be a relatively high likelihood of an occurrence or onset of user confusion. It is further appreciated by one skilled in the arts that using the received supplemental information to determine likelihood of user confusion may be incorporated in the implicit and/or explicit determination of user confusion to improve the reliability and accuracy of the determination that the user has become, or will likely to become, confused. Thus, the occurrence of supplemental information provided in the media content event itself in conjunction with sensed biometric data that indicates the occurrence or the onset of confusion on the part of the user may improve the reliability of the determination of user confusion.

Further, characteristics and/or attributes of the received supplemental information may be used to more accurately identify the part of the media content event (visual, audio or cultural) that is most likely to be the source of user confusion. For example, the received supplemental information may describe an object being shown in the video portion of the presenting media content event. Here, embodiments of the content confusion and contextual supplemental information system 100 may use this information to determine the part of the presenting media content event that is causing confusion is the visual part. As another example, the received supplemental information may provide a description of some historical event associated with the presenting portion of the media content event. Here, embodiments of the content confusion and contextual supplemental information system 100 may use this information to determine that the part of the presenting media content event that is causing confusion is the cultural part of the presenting media content event.

Once the likelihood of user confusion is determined based on the analysis of the attributes associated with the supplemental information and the attributes of the user, and further if the part of the presenting media content event that is likely to cause user confusion is determined, clarifying supplemental information may be generated and presented to the user. The clarifying supplemental information may be based on the received supplemental information. Alternatively, or additionally, other sources of information may be used to generate the clarifying supplemental information. The other information may be used to replace all of, or parts of, the received supplemental information.

In alternative embodiments, the processes described herein performed by the media device 202 may alternatively, or additionally, be performed remotely at another electronic device or system. In a non-limiting example embodiment, the media device 202 is communicatively coupled to a remote content confusion and contextual supplemental information (CCCSI) system 268. Here, the information pertaining to the one or more detected user characteristics as described herein are communicated to the remote CCCSI system 268 where a determination of the time of an occurrence or onset of user confusion is made. Based on the determined time of the occurrence or onset of user confusion, the part of the currently presenting media content event 256 that is the likely source of the user's confusion is determined. Once the part of the currently presenting portion of the media content event which has likely caused the user's confusion is determined, the clarifying supplemental information may be generated and then communicated to the media device 202 for presentation to the user. That is, the entire process, or any part thereof, may be performed remotely by some embodiments of the content confusion and contextual supplemental information system 100.

In the various embodiments, the media device 202 may communicatively coupled to the remote CCCSI system 268 via the communication system 270. The media device 202 communicatively couples to the communication system 270 at the communication system interface 234 that is configured to communicate uses a suitable wireless signal and/or a suitable wire-based signal. Any suitable wireless and/or wire-based connection type and/or communication formats may be used by the media device 202. The communication system 270 is illustrated as a generic communication system. In one embodiment, the communication system 270 comprises a cellular telephone system, such as a radio frequency (RF) wireless system. Accordingly, the media device 202 includes a suitable transceiver. Alternatively, the communication system 270 may be a telephony system, the Internet, a Wi-fi system, a microwave communication system, a fiber optics system, an intranet system, a local access network (LAN) system, an Ethernet system, a cable system, a radio frequency system, a cellular system, an infrared system, a satellite system, or a hybrid system comprised of multiple types of communication media. Additionally, embodiments of the media device 202 may be implemented to communicate using other types of communication technologies, such as but not limited to, digital subscriber loop (DSL), X.25, Internet Protocol (IP), Ethernet, Integrated Services Digital Network (ISDN) and asynchronous transfer mode (ATM). Also, embodiments of the media device 202 may be configured to communicate over combination systems having a plurality of segments which employ different formats for each segment that employ different technologies on each segment.

In the various embodiments, the media device 202 generates and presents the clarifying supplemental information to the confused user. In the various embodiments, the media device 202 establishes a communication link 274 to one or more remote information sources 272 that are operable to provide information that has been selected based on the attributes of the part of the currently presenting media content event 256 that has likely caused the user's confusion. Here, the communication system interface 234 is used to establish the communication link 274 to the remote information source 272, via the communication system 270.

Summarizing the various processes performed by various embodiments of the content confusion and contextual supplemental information system 100, the first objective is to determine an occurrence or an onset of user confusion while the user is viewing and/or is listening to a presenting media content event. The determination of the occurrence or onset of user confusion may be implicitly determined based on monitoring the user, may be implicitly determined based on received supplemental information, and/or may be explicitly determined based on user input.

Once the determination of an occurrence or onset of user confusion has been made, a determination of the time of the occurrence or onset of user confusion must be made based on the time that the information that indicates the user confusion is received. Next, the time of user confusion is associated with the presentation times of the portion of the media content event that was being presented at the time of the occurrence of the onset of the user confusion. Then, embodiments of the content confusion and contextual supplemental information system 100 determine which particular part(s) of the presenting portion of the media content event is causing the user confusion.

FIG. 3 conceptually illustrates a portion 302 of a streaming media content event currently being presented to the user. The portion 302 resides in the received media content stream 204. The portion 302 of the streaming media content event includes a video stream 304, a corresponding audio stream 306, a corresponding meta data stream 308, and an optional closed captioning stream 310.

The video stream 304 is comprised of a plurality of serially sequenced video frames 312, each having image information this is used to generate a particular image of a media content event. The video frames 312 are serially presented so as to create a moving picture. To determine if the part of the media content event that is causing the user confusion is the video part (interchangeably referred to herein as the visual part), one or more of the video frames 312 are analyzed.

The audio stream 306 may include spoken words, music, and background sounds. Presentation of the audio stream 306 is sequenced with presentation of the video frames 312 such that spoken words, music, and background sounds of the audio stream 306 correspond in time with the presentation time of the moving picture created by the serial presentation of the video frames 312. To determine if the part of the media content event that is causing the user confusion is the audio part, a portion of the audio stream 306 is analyzed.

Some media content streams 204 may include a meta data stream 308 which contains other information of interest. Such information may describe characteristics of the scene of the corresponding video frame 312 and/or describe attributes of the audio stream 306 portion. As noted herein, the content producer may add supplemental information that is received in the metadata stream 308. To determine if the part of the media content event that is causing the user confusion is the visual part, the audio part, and/or the cultural part, a portion of the meta data stream 308 may be analyzed.

The optional closed captioning stream 310 is also conceptually illustrated as part of the streaming media content event. The closed captioning stream 310 is typically a textual representation of the words of the dialogue spoken in the audio stream 306. The textual representation is provided for hearing impaired viewers or for viewers at a location with loud ambient noise, and is typically presented in an area of the display that is not being used to present the video portion of the media content event. The closed captioning text may be presented when relatively loud ambient noise levels are present, such as a bar or the like. The textual words of the closed captioning stream 310 are sequenced so as to generally correspond to the spoken words of the audio stream 306. To determine if the part of the media content event that is causing the user confusion is the audio part, a portion of the closed captioning stream 310 is analyzed.

Alternatively, or additionally, to determine if the visual part, the audio part, and/or the cultural part of the media content event that is causing the user confusion is the cultural part, a portion of the closed captioning stream 310 may be analyzed.

The serially sequenced video frames 312 may, in some formats, comprise different frame types, such as an I-frame (intra coded frame or slice), a P-frame (predicted frame of slice) and a B-frame bi-directional predicted frame or slice), that are compressible to different degrees. The I-frame is the least compressible but doesn't require other video frames to decode. The P-frame may use data from previous I-frames to decompress and are more compressible than an I-frame. The B-frame can use both previous and forward frames for data reference to get the highest amount of data compression. Other compression techniques may be used to compress the images of the media content stream 204. As used herein, a complete video image frame corresponds to a substantially complete set of data or information that may be used, by itself, to generate the image. If other compression formats are used, such formats from time to time have a frame that corresponds to a complete video image frame. Accordingly, if a portion of the video stream is analyzed, an I-frame from that portion may be preferably selected for analysis since the data of the selected I-frame is complete.

With respect to FIG. 3, assume hypothetically that the occurrence or onset of the user's confusion occurs at a real time 314 (which may be measured in real time by the clock 237 or based on remotely received time information). At the time 314, the video frame 316 is currently being presented in the media content event. The video frame 316 has an associated presentation time which may be defined by a time stamp or other time information that indicates the relative presentation time of that particular video frame 316. Typically, the presentation time of video frame 316 is reference to a start time that corresponds to the beginning of the media content event. Accordingly, the real time 314 is associated with the presentation time of video frame 316.

It is appreciated by one skilled in the art that the video frame 316 is part of a currently presenting scene of the media content event. Such a scene may be conceptually illustrated by the time span denoted as $T_1$. Thus, a plurality of serially sequenced video frames 302 are associated with the scene. The scene is bounded by the presentation times 318a and 318b, which may be associated with the real times of presentation as the media content event is being presented to the user. Optionally, the metadata stream 308 may include indicators or other information that identifies the scene boundary. Accordingly, some embodiments of the content confusion and contextual supplemental information system 100 are configured to identify a particular scene of the presenting media content event which was being presented at the time that the determination of the time of an occurrence or onset of user confusion was made.

However, it is appreciated that some amount of time may be required for the user to view, to hear, or to otherwise cognitively acquire that particular portion of the media content event that caused their confusion. Such delay may be associated with the cognitive processes within the user during the onset of their confusion.

Another source of delay may be the time for the user to physically react to their confusion, which is only then detected by the camera 230, the microphone 232, and/or the biometric sensor 264. Further, some amount of computation time is required for the processor system 218 to process and analyze information acquired by the camera 230, the microphone 232, and/or the biometric sensor 264 when the confusion is implicitly determined.

Similarly, some amount of delay will occur for the user to explicitly express their confusion, such as by actuation of one or more or the controllers 250 on the remote control 248 and/or by speaking some recognizable word or phrase that is associated with user confusion. And, some amount of computation time is required for the processor system 218 to process the received user input.

Accordingly, one skilled in the art appreciates that the initial source of the user's confusion is more likely than not to be at a time earlier than the time 314. To conceptually illustrate this earlier time, the times 320a and 320b are illustrated. Here, embodiments of the content confusion and contextual supplemental information system 100 are operable to estimate the times 320a and 320b. Here, the time 314 is adjusted in accordance with one or more of the known or assumed time delays described herein to arrive at the times 320a and/or 320b.

Because the relationship between the real time 314 and the video frame presentation time of video frame 316 is known, the corresponding presentation times in the media content event that correspond to the times 320a and 320b may then be determined. This time span is conceptually illustrated as the time duration $T_2$.

Next, embodiments of the content confusion and contextual supplemental information system 100 are configured to access and then analyze the portions of the video stream 304, the audio stream 306, the meta data stream 308, and/or the closed captioning stream 310 to identify the part of the media content event that has most likely caused the user's confusion. In some instances, the information used to implicitly infer the user's confusion and/or information in the explicit user input may be used to identify which part (visual, audio, or cultural) of the media content event is the source of the user's confusion. However, one or more of the portions of the video stream 304, the audio stream 306, the meta data stream 308, and/or the closed captioning stream 310 may be analyzed in greater detail to determine the attributes of that particular duration or portion $T_2$ of the media content event which has caused the user confusion.

Analysis of the video part of the media content event is based on a selected one or more of the video frames 322 associated with the presentation times for the duration or portion $T_2$ of the media content event. Any suitable object recognition process or algorithm now known or later developed may be used to identify an object that is presented in the image of one or more of the video frames 322. Once an object is identified, embodiments of the content confusion and contextual supplemental information system 100 are operable to determine an identifier that is associated with the identified object. For example, if the identified object is a physical object such as a building, vehicle, person or the like, then the identifier of the object may be used to access the clarifying supplemental information pertaining to the identified object.

Analysis of the audio part of the media content event is based on a selected one or more of the audio portion 324 associated with the presentation times for the duration or portion $T_2$ of the media content event. Any suitable audio or sound content analysis process or algorithm may be used to identify an object, a topic, music and/or a subject that is being discussed, described and/or presented in the audio portion 324. In some situations, a particular word or phrase may be identified. Once identified, the word or phrase may be converted into text that is used to search for the pertinent clarifying supplemental information that will be presented to the user.

Alternatively, or additionally, the information in the portion 326 of the closed captioning stream 310 may be similarly analyzed to identify dialogue (text) that may be the source of the user's confusion. The text may correspond to an object, a topic, music and/or a subject that is being discussed, described and/or presented in the media content event.

Alternatively, or additionally, a song may be identified in the analyzed audio portion 324 and/or the closed captioning portion 326. Then, using the identifier of the song, information relating to the identified song may be accessed to generate the clarifying supplemental information.

Analysis of the cultural part of the media content event may be based on any one or more of the portions of the video stream 304, the audio stream 306, the meta data stream 308, and/or the closed captioning stream 310. The video portion 324 may be used to identify one or more objects being shown in the video frames 322. One or more cultural attributes for the identified object is then determined. The audio portion 324 and/or closed captioning portion 326 may be analyzed for phrases that may be associated with one or more cultural attributes. Dialect and/or accents may be identified that can be associated with cultural attributes. The closed captioning stream portion 326 and/or the metadata portion 328 may have information that may be associated with one or more cultural attributes. The determined cultural attributes may then be evaluated to determine the cultural part of the media content event, and thereby determine if the source of the user's confusion is likely to have been caused by the cultural part of the presenting media content event.

After the occurrence or onset of the user confusion has been detected and/or determined, after the part (visual, audio, cultural) of the media content event that is the source of their confusion has been identified, and after the portion of the media content event that has presented the part that caused the confusion has been identified, embodiments are operable to obtain information that is pertinent to the source of the user's confusion. Here, attributes of the part of the media content event which are determined to be the cause of confusion are used to identify pertinent information that is available to be used to generate the clarifying supplemental information.

Embodiments of the content confusion and contextual supplemental information system 100 are configured to access one or more remote information sources 272 (FIG. 2) to access and obtain pertinent information that is available to generate the clarifying supplemental information. In an example embodiment, the browser 244 is used to establish a communication link 274 to a selected remote information source 272 via the communication system 270. The browser 244 is used to then query or search the information available from the remote information source 272.

In some embodiments, the retrieved information (such as a web page or the like) is presented to the user. Thus, the user is presented the same or a similar web page "as if" the user had searched for the clarifying supplemental information using their own computer. The presented web page may include textual information, image information (still images and/or video clips), and/or audio information. As is appreciated by one skilled in the arts, various resizing and/or reformatting functions may be automatically performed by the browser 244 and/or the content confusion and contextual supplemental information system 100 to optimize presentation of the displayed web page. However, in this situation, the presented web page (here, the clarifying supplemental information) is substantially the same as the information that is provided by the remote information source 272.

In some situations, the pertinent information retrieved from the remote information source 272 is then further processed to "filter" out and reduce the amount of information and/or to identify and select the most relevant information that is pertinent to the determined source of the user's confusion. Here, one skilled in the art appreciates that too large of an amount of presented information may be confusing to the user. Also, a large amount of information may require a relatively large amount of time for the user to acquire and comprehend. Thus, embodiments are configured to identify the least amount of relevant pertinent information pertaining, or at least a reduced amount of information, that is anticipated to be necessary to clarify or resolve the source of the user's confusion. Embodiments then generate and present this filtered information to the user (referred to herein as the clarifying supplemental information). Any suitable filtering process or logic now known or later developed may be used by the various embodiments of the content confusion and contextual supplemental information system 100.

In addition to identification of the least amount or reduced amount of relevant pertinent information that is needed to the clarify or resolve the source of the user's confusion, embodiments may optionally further determine a preferred format for the presentation of the clarifying supplemental information. In some situations, the clarifying supplemental information may be presented using a video or image only format (with no textual or audio information). For example, a single image may be sufficient to provide clarification to the user. Or, a series of the same or similar images may be interleaved into the media content event. The presentation duration of each presented image may be so short, such as for approximately thirteen milliseconds or less, such that the user is not able to perceive the image itself. But, the repeated presentation of the series of images, each separated by some predefined duration, may impart sufficient information to the user to alleviate their confusion. Brief presentation of a series of images is known in the arts as subliminal perception. Any suitable type of subliminal presentation now known or later developed may be employed by the various embodiments of the content confusion and contextual supplemental information system 100.

In some instances, embodiments access all of the information that is used to generate the clarifying supplemental information from a single remote information source 272. Alternatively, embodiments may obtain information from a plurality of different remote information sources 272. The content confusion and contextual supplemental information system 100 may analyze the information received from the plurality of different remote information sources 272, identify the most pertinent and/or most relevant portions of the received information, and then generate the clarifying supplemental information there from. For example, short video clips and/or audio clips may be obtained from a particular one of the remote information sources 272, and then be added to or combined with textual information received from another remote information source 272.

In some embodiments, the clarifying supplemental information may be generated and be visually presented as text to the user. The text may be presented in a predefined portion of the display 212, on the display 262 of the HMD 260, and/or on the display of another electronic device. The text may be presented using a banner or the like at a location that does not interfere with the presenting portion of the media content event. Alternatively, the text may be presented using a picture-in-picture format, a picture-over picture format, or the like. The text may be presented using a scrolling type of text presentation, or by using a paging process wherein a successive series of presented pages shown the clarifying text.

In some embodiments, a virtual graphical icon, avatar or the like may be incorporated into the visual portion of the clarifying supplemental information that is presented to the user. For example, but not limited to, a visual animated avatar representing a person may be incorporated into the clarifying supplemental information that is presented on the display 262 of the HMD 260 using a three-dimensional (3D) virtual reality format. Thus, the confused user may perceive that a person has arrived in their virtual 3D space to provide an explanation to clarify or resolve their confusion. The avatar may be configured to resemble another person that the user knows, such as a famous person, a friend or a relative.

Further, the avatar, and any video information and/or textual information of the clarifying supplemental information, may be presented at a predefined location in the 3D virtual reality space that has been created as a virtual world by the user's HMD 260. Here, the user simply turns their head to view presentation of the clarifying supplemental information (while the presentation of the media content event continues). Alternatively, presentation of the media content event may be paused in response to the turning of the user's head to view the presented clarifying supplemental information. Presentation of the media content event may then resume in response to the user turning their view back to the location in the 3D virtual reality space being used for presentation of the media content event.

Additionally, or alternatively, the clarifying supplemental information may be presented as audio information that is presented on the speakers 214 and/or on the headphone 258, the HMD 260, or another electronic device. If multiple users are present, the particular user experiencing the confusion may be presented the audio clarifying supplemental information only on their headphones 258 or HMD 260 such that the other users do not hear the presented clarifying supplemental information. In some situations, the volume of the audio portion of the presenting media content event may be muted or reduced to a lower volume level so that the user hears the audio portion of the presenting clarifying supplemental information over the continued presentation of the audio portion of the media content event.

In some situations, the user may predefine the format that is to be used to present the clarifying supplemental information. For example, the user may prefer to have the clarifying supplemental information presented to them in an audio format. Such audio presentation format may be particularly desirable if the dialogue of the media content event is not in the user's native language and/or if the dialogue is difficult to hear because of an accent used by the performing actors. Alternatively, the user may prefer a visual presentation of the clarifying supplemental information using a textual format and/or an image format. The user may be able to more quickly acquire and comprehend the clarifying supplemental information when presented using a visual format. Based on the user's preference, the user's preferred format for presentation of the clarifying supplemental information may be used to generate the clarifying supplemental information.

Embodiments of the content confusion and contextual supplemental information system 100 are configured to control "when" the generated clarifying supplemental information is presented to the user. In some instances, the clarifying supplemental information is presented concurrently with continued presentation of the media content event. Alternatively, presentation of the media content event may be paused or discontinued while the clarifying supplemental information is being presented to the user. Presentation of the media content event may resume after the clarifying supplemental information has been presented and/or after the user has comprehended the presented clarifying supplemental information. Biometric information may be analyzed to determine that the user is no longer confused. Alternatively, or additionally, a user input may be received which indicates that the user is no longer confused.

In some situations, the clarifying supplemental information is presented to the user after the conclusion of media content event. For example, the clarifying supplemental information may be relatively large such that it is not practical to present the clarifying supplemental information concurrently with the media content event and/or is not practical to pause presentation of the media content event while the clarifying supplemental information is presented to the user (because the time required to comprehend the clarifying supplemental information is so long that the user's enjoyment of the media content event would be disrupted). In such situations, the clarifying supplemental information may be separately presented after the end of presentation of the media content event.

Alternatively, the clarifying supplemental information may be presented to the user prior to start of presentation of media content event. Such presentation is possible if the likelihood of confusion at one or more portions of the media content event can be anticipated. For example, the phrase "back of the bus" may be known to be presented at some point in the media content event. Embodiments may have also determined that and/or learned that the user, because of their cultural background, age or other user attribute, is likely to not understand the meaning of that particular phrase. Accordingly, prior to presenting the media content event, the clarifying supplemental information describing the context of the phrase "back of the bus" that is related to Rosa Parks and her civil rights legacy may be presented to the user. Thus, when the user encounters the phrase "back of the bus" during presentation of the media content event, they will be unlikely to (or at least be less likely to) become confused by this particular phrase.

In practice, a listing or the like of potentially confusing topics may have been predefined for a particular media content event by a third party or another electronic device, such as another media device 202 and/or a remote CCCSI system 268. The listing, for each potentially confusing topic, includes a plurality of identifying attributes associated with each particular one of the confusing topics. This listing also identifies the locations in the media content event where such confusing topics are presented. This information identifying the confusing topics and the associated listing information may be stored in a suitable database.

When a user initiates presentation of that particular media content event, a list of attributes associated with that user is retrieved. The user attributes are then compared with the attributes associated with the various confusing topics of that particular media content event. For each match or correlation between a user attribute and a confusing topic attribute, a list of potentially confusing topics that may potentially confuse the user is generated. Then, clarifying supplemental information for each potentially confusing topic may be generated and then presented to the user prior to the beginning of the presentation of the media content event. Since the presentation location of each topic in the media content event is known, the order of presentation of the series of clarifying supplemental information may be based on an order of topic presentation.

In some embodiments, a "skip" feature may be employed to allow the user to selectively skip through the clarifying supplemental information for a particular one of the potentially confusing topics when a plurality of clarifying supplemental information is presented separately from the media content event. For example, one of the controllers 205 of the remote control 248 may be configured to, in response to user actuation, cause an end of presentation of the currently presenting portion of the clarifying supplemental information, and to cause the start of the next portion of the clarifying supplemental information for the next topic.

In some situations, commercials, advertisements or the like may be interspersed within the media content event. Alternatively, or additionally, there may be natural breaks in the presented media content event, such as when a transition between scenes occurs. Alternatively, or additionally, there may be natural breaks in the presented dialogue of the presenting media content event, such as when an actor stops speaking. During such natural breaks in the media content event, the supplemental information may be presented to the user. In some embodiments, the clarifying supplemental information may replace one or more commercials.

Embodiments of the content confusion and contextual supplemental information system 100 may automatically determine when the clarifying supplemental information is to be presented to the user. The particular generated clarifying supplemental information may be relatively small such that it can be presented to the user with a minimal disruption of the user's enjoyment and/or comprehension of the presenting media content event. On the other hand, the clarifying supplemental information may be automatically presented before presentation of the media content event begins, during (with an attendant pausing of the media content event presentation), or after the conclusion of the presentation of the media content event. Alternatively, the user may specify when they wish to have the clarifying supplemental information presented.

In some embodiments, the clarifying supplemental information is not presented to the user the first time that the media content event is presented. The clarifying supplemental information may later be presented to the user if the user later views the same media content event a second time.

In some embodiments, the clarifying supplemental information is not presented to the user the first time that the confusing topic is first presented in the media content event. The clarifying supplemental information may later be presented to the user if the same confusing topic is later presented in the media content event.

Alternatively, or additionally, the user may effect a rewind operation or jump back operation to go back through presentation of a scene or portion of the media content event which previously presented a confusing topic. In an example embodiment, the clarifying supplemental information is then presented before presentation of the scene or portion of the media content event is resumed. Alternatively, the clarifying supplemental information may be presented concurrently with the presentation of the repeated scene or portion of the media content event.

In some embodiments, the content confusion and contextual supplemental information system 100 automatically performs a rewind operation or jump back operation in response to determining that the user has become confused. The automatic rewind operation or jump back operation may go back (rewind) through the media content event by some predefined duration, such as for five seconds or the like. Alternatively, the automatic rewind operation or jump back operation may go back to the start of the currently presented scene of the media content event (where scene transitions or scene beginnings are identified in the metadata of the media content event). Alternatively, the automatic rewind operation or jump back operation may go back to a point in the presentation time that the initial user confusion was detected or identified (or back beyond that point by some predefined duration, such as thirty seconds or the like). Thus, the user has the opportunity to acquire and comprehend the clarifying supplemental information, and then review the portion of the media content event that caused their confusion.

In some embodiments, when the rewind operation or jump back operation occurs, portions of the dialogue that caused the user's confusion may be replaced with audible clarifying supplemental information. For example if a phrase of slang has been determined to confuse the user, then the slang is replaced with audible dialogue corresponding to the replaced slang such that the user then comprehends the dialogue of the repeated scene or portion of the media content event. Similarly, if a language of the dialogue is different from the native language of the user, then the foreign language dialogue is replaced with audible native language dialogue corresponding to the replaced foreign language dialogue such that the user comprehends the dialogue of the repeated scene or portion of the media content event.

Alternatively, or additionally, the clarifying supplemental information may be presented to the user if a different media content event having similar confusing topics is presented to the user. For example, one subject of the currently presenting media content event may pertain to the civil war and the subsequent civil rights movement. The generated clarifying supplemental information for the previously presented first media content event is stored for later access. A different later presented second media content event may also present information pertaining to the civil war and/or the civil rights movement. The stored clarifying supplemental information may be retrieved and then presented to the user so that they are less likely to be confused during presentation of the second different media content event. Alternatively, the stored clarifying supplemental information may be presented to other users who experience confusion when they encounter the same or a similar confusing topic in a media content event that they are viewing and/or are listening to.

Some embodiments of the content confusion and contextual supplemental information system 100 may be optionally configured to determine a degree of confusion on the part of the user. That is, a determination is made whether the extent of the confusion is relatively small (that is, there is little confusion on the part of the user) or whether the extent of the confusion is relatively large (that is, the user is very confused). The determined extent of the degree or amount of user confusion may be used to define a quantity of clarifying supplemental information that is presented, and/or to select particular attributes of the clarifying supplemental information that is presented.

For example, if the extent of the user's confusion is relatively small, one or two images and/or a short sentence of text or dialogue may be generated. This relatively small amount of clarifying supplemental information may then be presented to the user. On the other hand, if the extent of the extent of the user's confusion is determined to be relatively large, a larger number of images and/or video clips, a relatively long textual description, and/or a longer duration audible discussion may be generated and presented to the user.

The extent of the user's confusion may be determined based on a variety of factors. When biometric information is used to identify the occurrence or the onset of confusion on the part of the user, a first value and/or type of the acquired biometric information may be associated with a first extent of confusion. A second value and/or type of the acquired biometric information may be associated with a second extent of confusion that is greater than the first extent of confusion.

For example, a first facial expression may be associated with a mild degree of confusion while another facial expression may be associated with a great amount of confusion on the part of the user. If the first facial expression of the user is identified, embodiments of the content confusion and contextual supplemental information system 100 determine that the user is only mildly confused, and a relatively small amount of clarifying supplemental information is generated and presented to the user. On the other hand, if the second facial expression is identified, embodiments may determine that the user is very confused, and then a relatively larger amount of clarifying supplemental information is generated and presented to the user.

As another example, a first value of heart rate, blood pressure or pupil dilation may be associated with a mild degree of confusion while another value may be associated with a great amount of confusion on the part of the user. If the first value of the heart rate, blood pressure or pupil dilation of the user is identified, embodiments of the content confusion and contextual supplemental information system 100 determine that the user is only mildly confused, and a relatively small amount of clarifying supplemental information is generated and presented to the user. On the other hand, if the second value of the heart rate, blood pressure or pupil dilation is identified, embodiments may determine that the user is very confused, and then a relatively larger amount of clarifying supplemental information is generated and presented to the user.

In yet another example, the user input may indicate the extent of the user's confusion. Actuation of a first controller 250 on the remote control 248 may be associated with a mild degree of confusion while actuation of another controller 250 may be associated with a great amount of confusion on the part of the user. Alternatively, a single actuation of the controller 250 on the remote control 248 may be associated with a mild degree of confusion while multiple and/or rapid actuations of the controller 250 may be associated with a great amount of confusion on the part of the user.

Once the extent of the user's confusion has been determined, an amount of clarifying supplemental information that is anticipated to clarify or resolve the user's confusion may be determined. Further, particular elements or attributes of the selected information may be intelligently picked so as to generate a sufficient amount of clarifying supplemental information that is presented to the user so that they may clarify or resolve their confusion. For example, a brief overview of the topic of confusion may be generated if the extent of the user's confusion is determined to be associated with a mild degree of confusion. Alternatively, a detailed discussion of the topic may be generated if the extent of the user's confusion is great.

In some embodiments, a plurality of different clarifying supplemental information is generated. A first portion of clarifying supplemental information is initially presented to the user, preferably a brief overview of the topic of confusion. If the user is satisfied, or if a determination is made that the user's confusion has been clarified or resolved, after presentation of the first portion of the clarifying supplemental information, no additional clarifying supplemental information is presented. On the other hand, the user is not satisfied, or if a determination is made that the user's confusion has not been clarified or resolved, after presentation of the first portion of clarifying supplemental information, then another second portion of clarifying supplemental information is presented to the user. Presumably, the second portion of clarifying supplemental information provides (includes) a greater amount of and/or a greater detail of explanation on the topic of confusion. Thus, the subsequently presented second portion of the clarifying supplemental information supplements the information that is initially presented in the first portion of the clarifying supplemental information.

As many levels or portions of clarifying supplemental information with increasing levels of detail and/or increasing amounts of information may be serially presented to the user as needed to clarify or resolve the user's confusion. If the first portion of clarifying supplemental information is sufficient alone to clarify or resolve the user's confusion, no additional clarifying supplemental information needs to be presented. However, if the user's confusion in not clarified or resolved after presentation of the first portion of the clarifying supplemental information, then the second portion of clarifying supplemental information is presented. Similarly, if the user's confusion in not clarified or resolved after presentation of the second portion of the clarifying supplemental information, then a third portion of clarifying supplemental information is presented. The process of presenting additional portions of the clarifying supplemental information, wherein each portion has a greater amount of information and/or an increasing level of detail, may continue as long as needed to clarify or resolve the user's confusion.

In some embodiments, the clarifying supplemental information may present one or more selectable links (commonly referred to as hyper links or the like) that the user may select to access additional clarifying supplemental information with greater amounts of information and/or increasing levels of detail. Selection of the link by the user causes the media device 202 to establish a communication link 274 using the browser 244 to an identified remote information source 272 that will provide the additional clarifying supplemental information. In response to establishing the communication link 274 to the remote information source, the media device 202 sends a request for the additional clarifying supplemental information to the remote information source 272. The remote information source 272 returns the requested clarifying supplemental information with is then presented to the user.

In the various embodiments, the selectable links may be presented to the user using a suitable graphical user interface. The user may navigate to one or more selectable links of interest, and then make their selection, using a controller 250 on their remote control 248. Alternatively, or additionally, biometric information may be analyzed to identify the user's selection of a particular link. For example, but not limited to, if the user is wearing the HMD 260 to view the presented links, the user's eye movements may be monitored to identify the user's selection of a particular link.

FIG. 4 is a block diagram of a content confusion and contextual supplemental information system 100 that is operable to control a remote content confusion and contextual supplemental information (CCCSI) system 268. Elements illustrated in FIG. 4 that are the same as, or that are similar to, like numbered elements of FIG. 2 are not described again in detail other than to the extent necessary to indicate differences in structure, operation and/or function.

The remote CCCSI system 268 is communicatively coupled to a plurality of media devices 202 and to a plurality of remote information sources 272 via the communication system 270. Once a communication link 274 is established between one of the plurality of media devices 202 or the plurality of remote information sources 272, information may be exchanged between the communicatively coupled devices.

From time to time, one of the plurality of media devices 202 may determine the occurrence or the onset of confusion on the part of the user. In response to this determination, the media device 202 may communicate information corresponding to the user's confusion to the remote CCCSI system 268.

If the information communicated to the remote CCCSI system 268 includes an identifier of the media content event currently being presented at the media device 202, and the presentation time associated with the presenting portion of the identified media content event, the remote CCCSI system 268 may process this received information to determine when during presentation of the media content event the user experienced their confusion. The media content event, or the portion of the media content event in proximity to the indicated presentation time, is accessed or retrieved by the remote CCCSI system 268. The portion of the media content event in proximity to the indicated presentation time is analyzed to determine which parts of the media content event (the visual part, the audio part, and/or the cultural part) has likely caused the user's confusion, and thereby determine when the user experienced their confusion. This determination may be optionally communicated back to the media device 202 for further processing as described herein.

In some situations, the received information optionally includes the time of the determined occurrence or the onset of confusion on the part of the user that has been determined at the media device 202, such as when determined by the clock 237 of the media device 202. Alternatively, if the media device 202 and the remote CCCSI system 268 are communicating in real time, the clock 237 of the remote CCCSI system 268 may determine this time.

In some applications, the media device 202 communicates the information received from the camera 230, the microphone 232, the biometric sensors 264, and/or electrode sensors 266 in the headphones 258 or the HMD 260 to the remote CCCSI system 268 for analysis. The remote CCCSI system 268 processes and analyzes the received information as described herein to determine the occurrence or the onset of confusion on the part of the user. Presentation time information of the currently presenting media content event (and the identifier or the media content event or a portion of the media content event itself) is also provided to the remote CCCSI system 268. The remote CCCSI system 268 may then determine the occurrence or the onset of confusion on the part of the user based on the received information from the camera 230, the microphone 232, the biometric sensors 264, and/or electrode sensors 266 in the headphones 258 or the HMD 260. This determination may be optionally communicated back to the media device 202 for further processing as described herein.

Information pertaining to various attributes of the user, such as one or more images and/of viewing histories, may be communicated to the remote CCCSI system 268. Based on the received information, the remote CCCSI system 268 may determine one or more attributes of the user, such as their age, nationality, or other cultural attributes. This determination may be optionally communicated back to the media device 202 for further processing as described herein.

If the information communicated to the remote CCCSI system 268 includes an identifier of the media content event currently being presented at the media device 202, and the presentation time associated with the presenting portion of the identified media content event, the remote CCCSI system 268 may process this received information to determine which part of the media content event (the visual part, the audio part, and/or the cultural part) is causing the user's confusion. The media content event, or the portion of the media content event in proximity to the indicated presentation time, is accessed or retrieved by the remote CCCSI system 268. The portion of the media content event in proximity to the indicated presentation time is analyzed to determine which part of the media content event (the visual part, the audio part, and/or the cultural part) has likely caused the user's confusion. This determination may be optionally communicated back to the media device 202 for further processing as described herein.

However, the part of the media content event that has caused the user's confusion may have been included in the information provided by the media device 202 to the remote CCCSI system 268. Accordingly, the remote CCCSI system 268 does not determine which part of the media content event caused the user's confusion. Rather, this determination is made at the media device 202.

Once the remote CCCSI system 268 has access to the information about the time of the occurrence or the onset of confusion on the part of the user, information about the associated presentation time of the media content event being presented at the media device 202, and/or information about the part of the media content event that has caused the user's confusion (whether determined at the remote CCCSI system 268 or at the media device 202), the remote CCCSI system 268 may generate the clarifying supplemental information.

To generate the clarifying supplemental information, the remote CCCSI system 268 establishes communication links to one or more of the remote information sources 272. Information is received at the remote CCCSI system 268 from the one or more remote information sources 272. That received information is used by the remote CCCSI system 268 to generate the clarifying supplemental information. The generated clarifying supplemental information is then communicated to the media device 202 for presentation to the user.

Information about the confused user, the attributes of the confusing topic and/or the media content event, and/or the generated clarifying supplemental information may be optionally saved or stored into the content confusion and contextual supplemental information database 402. Any suitable relational database format or system may be used by the various embodiments. The saved information may be stored locally or remotely. The stored information may be distributed among a plurality of like remote CCCSI systems 268 for future use when the user and/or other users become confused when the same or similar confusing topics are presented on their respective media devices 202.

In some embodiments, the above-described information associated with each user confusion event is stored in the content confusion and contextual supplemental information database 402. The attributes and identity of the confused user may be saved in the event that a similar and potentially confusing topic is encountered in the same media content event or a different later presented media content event (with the same or similar confusing topics) is presented to that user. The clarifying supplemental information can be accessed from the content confusion and contextual supplemental information database 402 and be communicated to the media device 202 for presentation to the user.

In some embodiments, the content confusion and contextual supplemental information database 402 is informed of the currently presenting different media content events being presented by the plurality of media devices 202. If the attributes of a particular user viewing and/or listening to a particular media content event tend to indicate a likelihood of confusion, embodiments may access and then communicate any previously generated and stored clarifying supplemental information that is determined to be relevant to that user.

Embodiments of the remote CCCSI system 268 may employ a distributed architecture with selected components distributed among a plurality of remote CCCSI systems 268. For example, the content confusion and contextual supplemental information database 402 may be distributed at one of the remote CCCSI systems 268. Alternatively, or additionally, the information stored in the content confusion and contextual supplemental information database 402 may be distributed among a plurality of remotely located memory devices or system (i.e., the "cloud").

As is appreciated by one skilled in the art, the EPG information 242 may store information pertaining to the plurality of media content events that are or will be available at a media device 202. Embodiments of the content confusion and contextual supplemental information system 100, either at the media device 202 or the content confusion and remote CCCSI system 268, may be configured to access the supplemental information associated with the media content events. This supplemental information may describe the subject matter and/or various topics of the associated media content event. The supplemental information may be analyzed and compared with attributes of the user who is or will be viewing and/or listening to that particular media content event. Accordingly, any clarifying supplemental information may be identified, generated or may be otherwise readily available for presentation to the user in the event that they become confused.

Alternatively, or additionally, potentially confusing topics may be identified from the supplemental information included in the EPG information 242. Clarifying supplemental information may then be identified, generated or may be otherwise readily available for presentation to the user in the event that they become confused.

It should be emphasized that the above-described embodiments of the content confusion and contextual supplemental information system 100 are merely possible examples of implementations of the invention. Many variations and modifications may be made to the above-described embodiments. All such modifications and variations are intended to be included herein within the scope of this disclosure and protected by the following claims.

The invention claimed is:

1. A media device that provides clarifying supplemental information to a user who has become confused about a currently presenting media content event, the media device comprising:
   a media content stream interface that receives a streaming media content event that presents theme-based visual content and audio content to a user;
   a presentation device interface that streams the media content event to a media presentation system with a display and at least one speaker, wherein the streaming visual content is presented on the display and the audio content is reproduced on the at least one speaker;

an interface that receives information pertaining to the user during presentation of the media content event to the user;

a processor system that is communicatively coupled to the media content stream interface, the presentation device interface, and the interface that receives information pertaining to the user, wherein the processor system is configured to:

determine that there is an occurrence or an onset of user confusion based on the received information pertaining to the user;

determine a time of the occurrence or the onset of the user's confusion based on the determination of the occurrence or the onset of the user's confusion;

associate a presentation time of a portion of the currently presenting media content event that corresponds to the determined time of the occurrence or the onset of the user's confusion;

identify a part of the portion of the currently presenting media content event that has caused the occurrence or the onset of the user's confusion, wherein the part of the portion of the currently presenting media content event corresponds to:

a visual part corresponding to visual information presented to the user by the currently presenting media content event when the visual part of the currently presenting media content event has caused the user confusion;

an audio part corresponding to audio information presented to the user by the currently presenting media content event when the audio part of the currently presenting media content event has caused the user confusion; and a cultural part corresponding to cultural information presented to the user by the currently presenting media content event when the cultural part of the currently presenting media content event has caused the user confusion; and generate clarifying supplemental information based on the accessed information, wherein the clarifying supplemental information includes a sufficient amount of clarifying information so that the user may clarify or resolve their confusion in response to presentation of the clarifying supplemental information, wherein the clarifying supplemental information is presented to the user.

2. The media device of claim 1, wherein the clarifying supplemental information that is presented to the user is audio information that audibly describes information pertaining to the part of the portion of the currently presenting media content event that has caused the occurrence or the onset of the user's confusion.

3. The media device of claim 1, wherein the clarifying supplemental information that is presented to the user is video information that pertains to the part of the portion of the currently presenting media content event that has caused the occurrence or the onset of the user's confusion.

4. The media device of claim 3, wherein the video information that pertains to the part of the portion of the currently presenting media content event that has caused the occurrence or the onset of the user's confusion is presented to the confused user on a region of the display of the media presentation system that is not being used for presentation of the video portion of the currently presenting media content event.

5. The media device of claim 3, wherein the confused user is wearing a head mounted device (HMD), the media device further comprising:

a HMD interface that is communicatively coupled to the HMD worn by the confused user, wherein the video information is presented to the confused user on a region of a display of the HMD that is not being used for presentation of the video portion of the currently presenting media content event.

6. The media device of claim 5, wherein the presented video information that is presented on the display of the HMD includes presentation of an avatar that represents a person who is providing an explanation to clarify or resolve the user's confusion.

7. The media device of claim 1, wherein the clarifying supplemental information that is presented to the user is presented while the currently presenting media content is paused.

8. The media device of claim 7, wherein after pausing presentation of the currently presenting media content event and after presenting the clarifying supplemental information to the user, the processor system is further configured to:

receive additional information pertaining to the user;

determine that there is no longer confusion on the part of the user based on the received additional information;

end presentation of the clarifying supplemental information in response to determining that the user is no longer confused; and resumes presentation of the currently presenting media content event after ending presentation of the clarifying supplemental information.

9. The media device of claim 7, wherein after pausing presentation of the currently presenting media content event and after presenting the clarifying supplemental information to the user, the processor system is further configured to:

receive a user input generated by a remote control being operated by the user, wherein the user input indicates that there is no longer confusion on the part of the user;

end presentation of the clarifying supplemental information in response to receiving the user input; and resume presentation of the currently presenting media content event after ending presentation of the clarifying supplemental information.

10. The media device of claim 1, wherein the interface that receives information pertaining to the user receives a user input from an electronic device, wherein the electronic device is operated by the user to generate the user input that is communicated to the media device, and wherein the user input indicates that the user is confused by the presenting media content event.

11. The media device of claim 10, further comprising:

a remote control interface configured to receive a wireless signal from a remote control that is operable to control the media device and to control components of a media presentation system, wherein the user input is generated by and communicated from the remote control in response to user actuation of one of a plurality of controllers on the remote control.

12. The media device of claim 10, wherein the electronic device comprises at least one selected from a group consisting of a smart phone, a cellular phone, a personal computer, a notebook computer, and a laptop computer.

13. The media device of claim 10, wherein the user input is one of a first user input, a second user input and a third user input, wherein the first user input indicates that the user's confusion pertains to the visual part of the currently presenting media content event, wherein the second user input indicates that the user's confusion pertains to the audio part of the currently presenting media content event, and wherein the third user input indicates that the user's confusion pertains to the cultural part of the currently presenting media content event.

14. The media device of claim 1, wherein the interface that receives information pertaining to the user comprises:
a biometric sensor interface that receives information from at least one biometric sensor, wherein the biometric sensor information pertains to a biometric condition of the user and is acquired while the media content event is being currently presented to the user, wherein the processor system is further configured to:
determine at least one of a change in the biometric condition and a value of the biometric condition; and
determine the occurrence or the onset of the user's confusion when the determined change in the biometric condition exceeds a change threshold or when the determined value of the biometric condition exceeds a value threshold.

15. The media device of claim 1, further comprising:
a communication system interface that communicatively couples the media device to a remote information source via a communication system,
wherein the processor system is further configured to access information from the remote information source, and
wherein the accessed information pertains to the identified part of the portion of the currently presenting media content event that has caused the occurrence or the onset of the user's confusion.

16. The media device of claim 15, wherein after presenting the clarifying supplemental information to the user, the interface that receives information pertaining to the user receives additional information pertaining to the user during presentation of the media content event, wherein the processor system is further configured to:
determine that the user confusion remains based on the received information pertaining to the user;
access additional information from the remote information source or another remote information source, wherein the accessed additional information pertains to the identified part of the portion of the currently presenting media content event that has caused the occurrence or the onset of the user's confusion, and wherein the additional information includes a greater amount of information than the amount of information initially received from the remote information source; and
generate additional clarifying supplemental information based on the accessed information, wherein the clarifying supplemental information includes a greater amount of clarifying supplemental information,
wherein the additional clarifying supplemental information is presented to the user.

17. The media device of claim 1, further comprising:
a clock that provides time information,
wherein the processor system is further configured to:
receive a first time from the clock corresponding to the occurrence or the onset of the user's confusion was determined; and
adjust the first time to a second time, where the second time precedes the first time by a predefined duration of time, wherein the predefined duration of time corresponds to a time that the part of the currently presenting media content event that caused the occurrence or the onset of the user's confusion was initially presented to the user and a subsequent reaction time of the user,
wherein the presentation time of a portion of the currently presenting media content event that corresponds to the determined time of the occurrence or the onset of the user's confusion is based on the second time.

18. The media device of claim 1, wherein the processor system is further configured to:
complete presentation of the currently presenting media content event; and
present the clarifying supplemental information after presentation of the currently presenting media content event has been completed.

19. The media device of claim 1, wherein the processor system is further configured to:
complete presentation of the portion of the currently presenting media content event that caused the occurrence or the onset of the user's confusion;
rewind the portion of the currently presenting media content event back to a beginning of the portion of the currently presenting media content event that caused the occurrence or the onset of the user's confusion;
present the clarifying supplemental information after presentation of the portion while the portion of the currently presenting media content event is rewinding; and
resume presentation at the beginning of the portion of the currently presenting media content event that caused the occurrence or the onset of the user's confusion after the clarifying supplemental information has been presented to the user.

20. The media device of claim 1, further comprising:
a communication system interface that communicatively couples the media device to a contextual supplemental information (CCCSI) system via a communication system,
wherein the processor system is further configured to:
generate information that is communicated from the communication system interface of the media device to the CCCSI system, wherein the information identifies the currently presenting media content event and the time of the occurrence or the onset of the user's confusion, wherein the CCCSI system identifies the part of the portion of the currently presenting media content event that has caused the occurrence or the onset of the user's confusion; and
receive return information from the CCCSI system, wherein the return information includes additional clarifying supplemental information that the pertains to the identified part of the portion of the currently presenting media content event that has caused the occurrence or the onset of the user's confusion,
wherein the additional clarifying supplemental information is presented to the user.

* * * * *